United States Patent
Feldman et al.

(10) Patent No.: US 9,223,612 B1
(45) Date of Patent: Dec. 29, 2015

(54) OBJECT-BASED COMMANDS WITH QUALITY OF SERVICE IDENTIFIERS

(71) Applicant: Seagate Technology LLC, Cupertino, CA (US)

(72) Inventors: Timothy R Feldman, Louisville, CO (US); James Prescott Hughes, Palo Alto, CA (US); Martin R Furuhjelm, Hamilton, MT (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/254,175

(22) Filed: Apr. 16, 2014

Related U.S. Application Data

(63) Continuation of application No. 14/175,495, filed on Feb. 7, 2014.

(60) Provisional application No. 61/817,309, filed on Apr. 29, 2013.

(51) Int. Cl.
  *G06F 3/00* (2006.01)
  *G06F 9/46* (2006.01)
  *G06F 9/54* (2006.01)

(52) U.S. Cl.
  CPC . *G06F 9/465* (2013.01); *G06F 9/54* (2013.01)

(58) Field of Classification Search
  CPC .......................................................... G06F 9/54
  USPC ......................................................... 719/310
  See application file for complete search history.

(56) References Cited

U.S. PATENT DOCUMENTS

| | | | |
|---|---|---|---|
| 5,548,751 A | 8/1996 | Ryu et al. | |
| 5,706,470 A | 1/1998 | Okada | |
| 6,038,607 A | 3/2000 | Hamilton et al. | |
| 6,105,027 A | 8/2000 | Schneider et al. | |
| 6,324,626 B1 * | 11/2001 | Uenoyama et al. | 711/163 |
| 6,460,095 B1 | 10/2002 | Ueno et al. | |
| 6,801,960 B1 * | 10/2004 | Ericson et al. | 710/33 |
| 7,058,692 B2 * | 6/2006 | Yamamoto et al. | 709/213 |
| 7,991,790 B2 | 8/2011 | Barker et al. | |
| 8,078,848 B2 | 12/2011 | Asnaashari | |
| 8,417,739 B2 | 4/2013 | Williamson | |
| 8,473,970 B2 | 6/2013 | Machiraju | |
| 8,505,036 B2 | 8/2013 | Chen | |
| 8,850,007 B2 * | 9/2014 | Massa et al. | 709/225 |

(Continued)

OTHER PUBLICATIONS

Yao-Jen Chang, Biometrics-based cryptographic key generation, 2004.*

(Continued)

*Primary Examiner* — Lechi Truong
(74) *Attorney, Agent, or Firm* — Cesari & Reed LLP; Kirk A. Cesari; Christian W. Best

(57) ABSTRACT

Systems and methods are disclosed for object-based commands with quality of service identifiers. In an embodiment, an apparatus may comprise a memory device having a processor configured to store data as objects, each object including an object identifier field to track the object, and a user data field for user data of the object. The processor may be further configured to receive a command including an operation directed to an object, and a quality of service identifier that specifies a level of service associated with the operation. Commands may be directed toward put, get, and delete operations, among others.

20 Claims, 11 Drawing Sheets

(56) References Cited

U.S. PATENT DOCUMENTS

| | | |
|---|---|---|
| 2003/0167399 A1* | 9/2003 | Audebert et al. ............ 713/191 |
| 2003/0177130 A1 | 9/2003 | Todd |
| 2005/0166014 A1* | 7/2005 | Kobayashi et al. ........... 711/112 |
| 2007/0097806 A1 | 5/2007 | Beker et al. |
| 2008/0209112 A1 | 8/2008 | Yu et al. |
| 2008/0280560 A1 | 11/2008 | Tuttle |
| 2010/0228737 A1 | 9/2010 | Riemers |
| 2010/0274868 A1 | 10/2010 | Arroyo et al. |
| 2011/0282846 A1 | 11/2011 | Shepard et al. |
| 2012/0233671 A1 | 9/2012 | Beder et al. |
| 2013/0097275 A1 | 4/2013 | Wofford et al. |
| 2013/0212425 A1 | 8/2013 | Blaine et al. |
| 2014/0149805 A1 | 5/2014 | Michihata et al. |

OTHER PUBLICATIONS

Information technology—SCSI Object-Based Storage Device Commands -2 (OSD-2), Seagate Technology, Jul. 24, 2008 http://hackipedia.org/Hardware/SCSI/Object-based%20storage/SCSI%20Object-Based%20Storage%20Device%20Commands%20-%202.pdf, No date.

* cited by examiner

OBJECT-BASED COMMANDS WITH QUALITY OF SERVICE IDENTIFIERS

CROSS REFERENCE TO RELATED APPLICATIONS

The present application claims priority to U.S. patent application, Application Ser. No. 14/175,495, filed Feb. 7, 2014, entitled "Command Sets and Functions"; and to U.S. provisional patent applications Serial No. 61/817,309, filed Apr. 29, 2013, entitled "New Command Sets and Functions," the contents of which are hereby incorporated by reference in their entirety.

SUMMARY

In an embodiment, an apparatus may comprise a data storage device configured to store data as objects having a variable-size data container, and to receive a command including an operation directed to an object and a quality of service identifier that specifies a level of service associated with the operation.

In another embodiment, an apparatus may comprise a memory device having a processor configured to store data as objects, each object including an object identifier field to track the object, and a user data field for user data of the object. The processor may be further configured to receive a command including an operation directed to an object, and a quality of service identifier that specifies a level of service associated with the operation.

In another embodiment, an apparatus may comprise a data storage device configured to store data as objects, each object including a tracking indicator to identify the object, and a data field with a variable size to store user data. The data storage device may be further configured to receive a command including an operation directed to an object, and a quality of service identifier that specifies a level of service associated with the operation.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, exchanged, or removed without departing from the scope of the present disclosure.

In some embodiments, a command set may be used to communicate data and instructions between devices, such as between different computers or between computers and peripheral devices. The command set may define commands, protocols and interfaces, and may comprise an application programming interface (API). For example, the interface protocol may define commands and communications over an Ethernet connection.

Figure 1A:
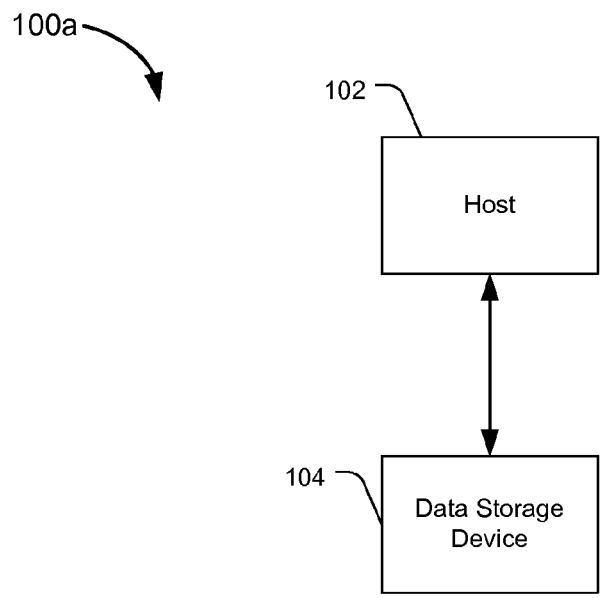
FIGS. 1a and 1b are diagrams of illustrative embodiments of a system employing object-based commands with quality of service identifiers.
Figure 1B:
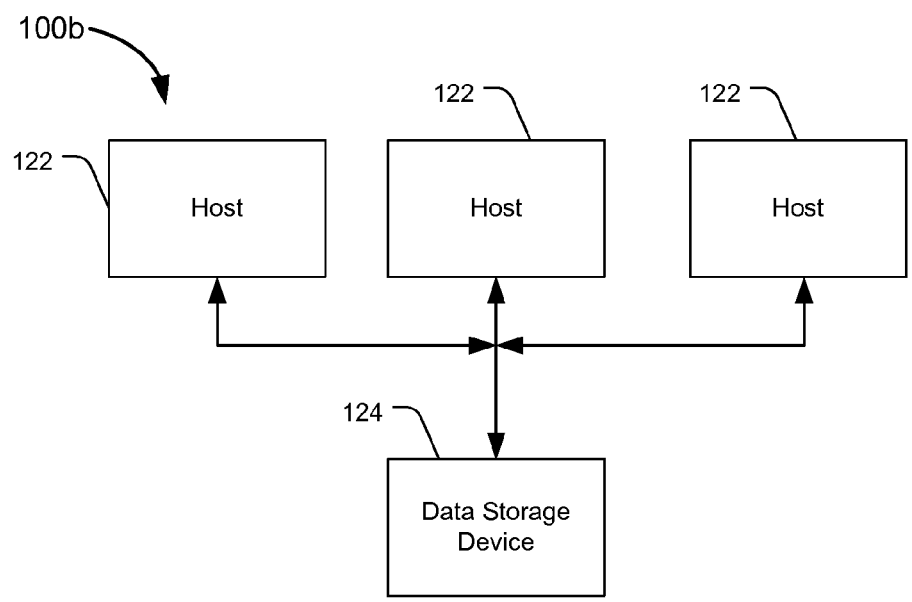
Figure 2:
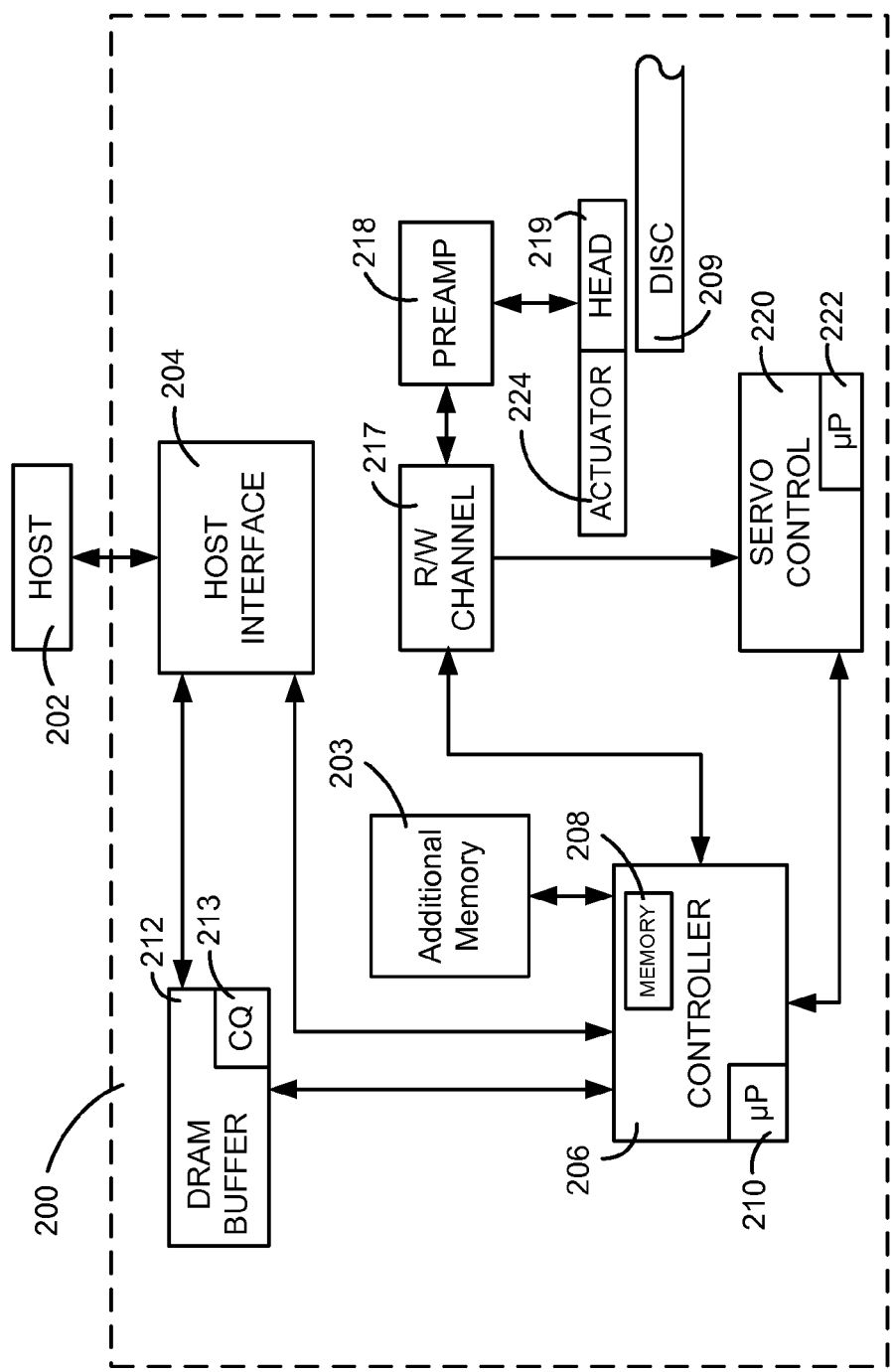
FIG. 2 is a diagram of another illustrative embodiment of a system employing object-based commands with quality of service identifiers.

In some embodiments, a device may store the command sets and related instructions, and may execute the command set protocols to communicate with other devices. FIGS. 1a, 1b, and 2 show example embodiments of devices that may store and execute the command sets and instructions.

FIG. 1a depicts an example embodiment of a system employing object-based commands with quality of service identifiers, generally designated 100a. The system 100a may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit. The DSD 104 can include one or more volatile or nonvolatile memories. For example, DSD 104 could be a hybrid HDD (hard disc drive) with both a disc memory and a nonvolatile solid state memory.

In some embodiments, a device configured to execute the command set may connect to multiple host or client devices, and may process commands received from the multiple clients asynchronously or synchronously. FIG. 1b depicts another example embodiment of a system employing object-based commands with quality of service identifiers, generally designated 100b. In some examples, a data storage device 124 may be connected to multiple host systems 122, such as a DSD accessible over local area or wide area network, as shown in FIG. 1b. An example may include an Ethernet network allowing access by multiple clients simultaneously. In some embodiments, the DSD 124 may connect to the hosts 122 over one or more interfaces simultaneously. For example, the DSD 124 may have multiple Ethernet interfaces to connect to hosts 122. In other embodiments, a DSD may have a single interface connected to multiple hosts. For example, a switch may be used to regulate access between multiple hosts. Devices, such as the DSD 124 and hosts 122, may have IP addresses that can be accessed locally or over an internet. In some embodiments, the DSD 124 may be able to access other data storage devices on the network in addition to host devices.

The data storage device 124 may include a data storage medium, which may be any kind of nonvolatile memory such as disc media or solid state memory, volatile memory such as random access memory, or a combination thereof. For example, a hybrid storage device may include a magnetic disc media and a solid-state Flash memory. The data storage device 124 may store the command set and instructions, and be configured to communicate with a host device 122 and execute commands and processes according to the command set and instructions, for example by executing them using a processor. In some examples, the API commands may be translated into other command protocols, such as SATA, by a translation or shim layer or bridge controller. In some examples, the API commands can be converted directly into low-level operations to control the device functions. In some examples, a device may support more than one file storage format or command set, such as the object-based API described and an address-based storage format. A device may potentially be configured to employ a storage space for each type of command set.

FIG. 2 depicts a diagram of an embodiment of a system employing object-based commands with quality of service identifiers, generally designated 200. Specifically, FIG. 2 provides a functional block diagram of an example disc drive data storage device (DSD) 200. An example data storage device such as shown in FIG. 2 may comprise a processor and a data storage medium contained within a casing, and an interface allowing the data storage device to be connected to and removed from a host device, as shown in FIG. 1a. The DSD 200 may be a data storage device such as the DSD 104 shown in FIG. 1a or DSD 124 shown in FIG. 1b. More generally, the DSD 200 can be a removable storage device, a desktop computer, a laptop computer, a server, a tablet computer, a telephone, a music player, set top boxes, network-attached storage (NAS) devices, clusters of networked devices, another electronic device, any other device which may be used to store or retrieve data, or any combination thereof.

The data storage device 200 can communicate with a host device 202 via a hardware or firmware-based interface circuit 204 that may include a connector (not shown) that allows the DSD 200 to be physically removed from the host 202. The host 202 may also be referred to as the host system or host computer. The host 202 can be a desktop computer, a laptop computer, a server, a tablet computer, a telephone, a music player, another electronic device, or any combination thereof. In some embodiments, the DSD 200 may communicate with the host 202 through the interface 204 over wired or wireless communication, or by a local area network (LAN) or wide area network (WAN). In some embodiments, the DSD 200 can be a stand-alone device not connected to a host 202, or the host 202 and DSD 200 may both be part of a single unit.

The interface 204 may be communicatively coupled to a buffer 212 a controller 206, or both. The buffer 212 can temporarily store data during read and write operations, and can include a command queue (CQ) 213 where multiple pending operations can be temporarily stored pending execution. In some examples, the buffer 212 can be used to cache data. The DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. A DSD 200 containing multiple types of nonvolatile storage mediums, such as a disc 209 and Flash 203, may be referred to as a hybrid storage device.

The DSD 200 can include a programmable controller 206 with associated memory 208 and processor 210. Further, FIG. 2 shows the DSD 200 can include a read-write (R/W) channel 217, which can encode data during write operations and reconstruct user data retrieved from disc(s) 209 during read operations. A preamplifier circuit (preamp) 218 can apply write currents to the head(s) 216 and provides pre-amplification of read-back signals. A servo control circuit 220, which can include a processor 222, may use servo data to provide the appropriate current to the coil 214 to position the head(s) 216. The controller 206 can communicate with the servo control circuit 220 to move the head(s) 216 to the desired locations on the disc(s) 209 during execution of various pending commands in the command queue 213.

Figure 3:
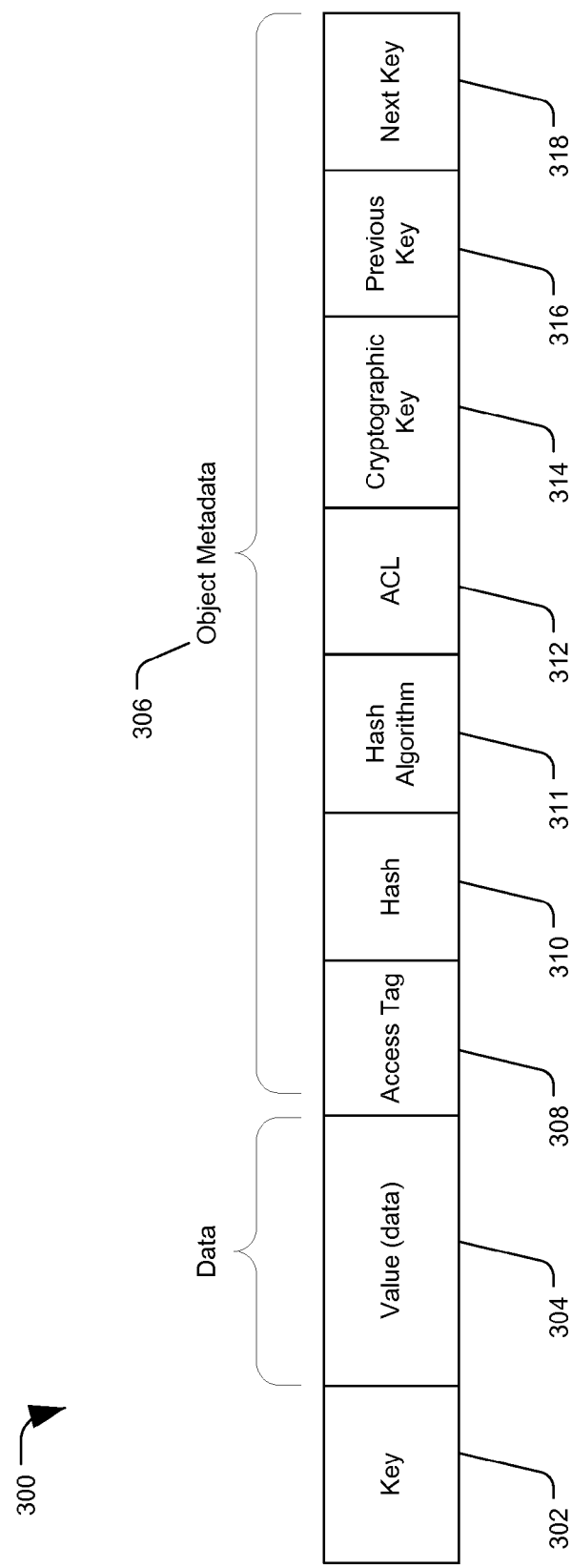
FIG. 3 is a diagram of another illustrative embodiment of a system employing object-based commands with quality of service identifiers.

FIG. 3 depicts an example embodiment of a system employing object-based commands with quality of service identifiers. A device employing the command set, such as a data storage device (DSD, which may also be referred to as a key/value storage device), may be configured to store data in an object-based format. Instead of providing a block-oriented interface that reads and writes fixed-sized blocks of data, a key/value storage device may organize data into flexible-sized data containers, called key/value objects, which may be referred to herein simply as "objects." FIG. 3 depicts an example of the fields that may be associated with an object. Each key/value object 300 may comprise a key 302, sometimes called a tracking indicator, identifying the object. Unless otherwise specified herein, the term "key" refers to tracking indicators for objects. An object 300 may also comprise a value 304, sometimes called a value field, payload, or data field, which may be data associated with the tracking indicator received from a client such as user data of the file. An object 300 may also comprise metadata 306, which may include a set of attributes associated with the object, identify access rights, or identify other nearby objects for example. The key 302 may be used as a tracking indicator for a key/value object 300. In some examples, the value 304 may include user data, appended host metadata received from the host device, or other data.

Objects 300 may also include object metadata fields 306, which may be different from host metadata stored in the value field, and may be used for management of objects. Unless otherwise specified, metadata as used herein refers to object metadata 306 usable by the DSD. The metadata 306 may include fields such as an access tag or "version" field 308 used to control access to the object 300, which can keep the object synchronized when multiple clients may have simultaneous access with asynchronous connections. In some embodiments, an object's metadata 306 may also include a hash 310 of data associated with the object, a hash algorithm 311 used to create the hash 310, cryptographic keys 314, an access control list (ACL) 312 to designate access rights (e.g. to designate which clients can access the object), identifiers for a next 318 or previous 316 object, e.g. according to a collation order based on the values of the keys, or other related information. Some information may be stored as a separate object related to the first object, for example an associated metadata file.

As specified, an access control list (ACL) may limit which clients can access an object, and may limit the performance of any action at all by a client on an object. In some embodiments, an ACL may be maintained for each object, listing the clients with access permissions. In some embodiments, a data storage device may maintain an ACL for each client or host designating which key ranges or key/value objects the client has access to. In some embodiments, a DSD may maintain access control lists linking clients and associated accessible objects.

The commands of the API may be used to access objects 300 stored on the data storage device, to control other operations of the device not related to data access, to retrieve information about the device, for other purposes, or any combination thereof. A DSD can fragment an object 300, so that an object may not need to be stored in contiguous physical storage areas of the DSD, and can keep track of the physical media containing the object using a mapping table, for example. A device may organize and access objects 300 and associated metadata 306 using mapping tables, binary or B+ trees, or other formats. For example, a B+ tree structure may include a number of internal nodes usable to rapidly traverse the tree, with actual objects stored as leaf nodes at the bottom of the tree, and each object leaf can have one or more pointers to other objects for sequential traversal of objects. In an example embodiment, sorted string tables (SSTs) may be used to store a set of objects, with the SSTs indexed by B+ tress. In some embodiments, objects 300 may be indexed by the value of the key 302, and a tree data format for each object may indicate the locations of the object's value field 304 and various metadata fields 306 (e.g. using pointers), and may list additional information such as the value field's total size. In an example embodiment, there may be one set of B+ trees or other organizational mechanisms for the values and hashes of the values, and another set for other metadata.

The value field 304 may be of any size, and in some examples an object 300 may have a null-sized value of 0 bytes. For example, null-size objects may be used to retain a reference to keys 302 that have previously existed but that have been retired or are not currently in use. Null-size key/value objects may be used to store a key for which there is no associated value, yet the existence of the key is meaningful. For example, null-sized key/value objects may serve as a semaphore for a host.

The command set may allow a device to recognize and execute a variety of commands. For example, a DSD employing the command set may be configured to receive commands over an interface, such as an Ethernet, SAS, SATA, or PCIe connection. The commands may originate from a device on the other end of the interface, such as a host system. More specifically, the commands may originate from an application, file system, device driver, or other application or process running on a host device.

Figure 4A:
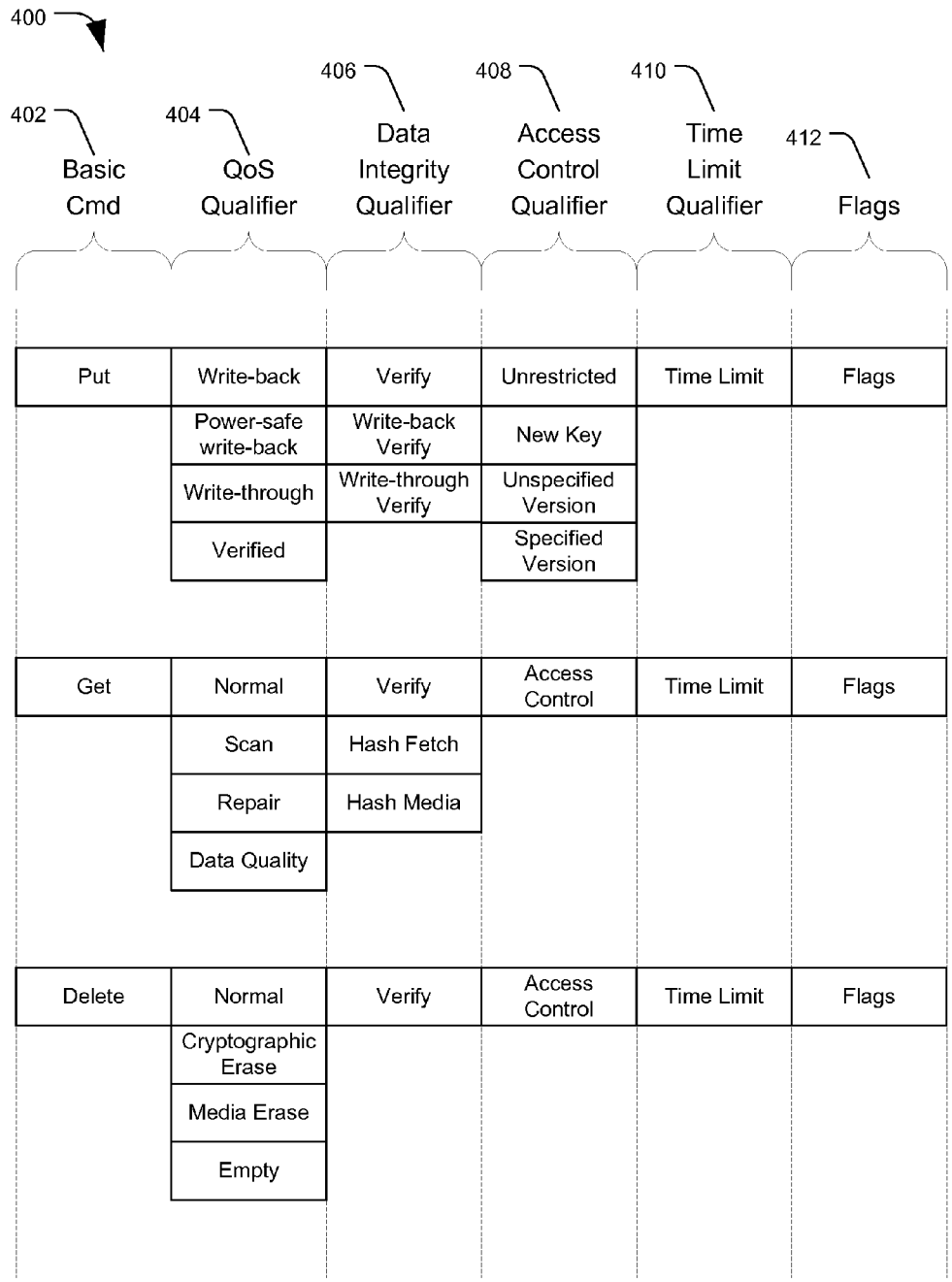
FIGS. 4A and 4B are diagrams of another illustrative embodiment of a system employing object-based commands with quality of service identifiers.

Turning now to FIG. 4A, a diagram of an example system employing object-based commands with quality of service identifiers is depicted and generally designated 400. The command set may include a number of base operations or basic commands 402 which may be about a specified object, including commands such as Put, Get, or Delete. Additional or fewer operations may also be included in the command set. Commands may also include modifiers or flags in addition to the basic command 402, such as a quality of service qualifier 404, a data integrity qualifier 406, an access control qualifier 408, or a time limit qualifier 410. Flags 412 may be used to identify metadata fields that should be returned in addition to any other data. Additional or fewer modifiers or flags may also be included. In some embodiments, commands may have a pre-defined structure, with certain bits having defined logical meanings, such as specifying a type of command and modifiers. In other embodiments, commands may be otherwise structured, such as having bits identifying a meaning or field for a number of following bits, so that unused potential fields or flags may not be included in a command. In some embodiments Protocol Buffers, such as Google Protocol Buffers, may be used for data communication. In some embodiments, data in commands may be structured using variant data types.

Put commands may be used to store data to a DSD, such as by adding key/value objects to the set of objects stored by the DSD. Get commands may request that fields of a key/value object be retrieved from a DSD, or otherwise direct the DSD to check the storage of an object. Delete commands may be used to erase data or designate occupied storage areas as available to store new data, such as by removing an object from lookup tables so that the drive treats the storage sectors as unoccupied. Specifically, the Delete command may be used to remove key/value objects from a DSD, or to associate a given key with a null value or other indicator that the object is deleted or invalid. In some embodiments, no Delete command may be necessary. For example, data can be "erased" using a Put operation with a Null value payload, or the DSD may designed to not support deleting data or modifying key/value objects, such as a write-once read many (WORM) device.

The basic commands 402 may specify a value for the key field for the target object, and data for the value field, such as in the case of a Put command. The command set may also include modifiers to the commands, such as qualifiers to modify the behavior of the commands, additional commands related to management or monitoring of the DSD, or other modifiers. A qualifier may be an indicator of a variation of an operation to perform, a sub-operation to perform, an additional operation to perform, or any combination thereof. For example, a command may include a basic command 402, and then a number of qualifiers to modify the behavior of the basic command and other access parameters.

For example, every command can have time limit qualifiers 410; e.g. a time limit value and an early exit flag. A time limit may be the amount of time from receipt of the command within which the DSD is directed to complete the command, with a time-limit-reached status returned if necessary. A time limit value may specify a real-world time limit on completing a command, which may include time spent on other commands so that a command may "time out" before a DSD can service it. An early exit flag may specify that the DSD should return a not-quickly-recovered status instead of employing long duration recovery methods such as multiple-revolution retries on rotating media. In some embodiments, an early exit flag may be included in a flags field 412, or the time qualifier field 410.

Figure 4B:
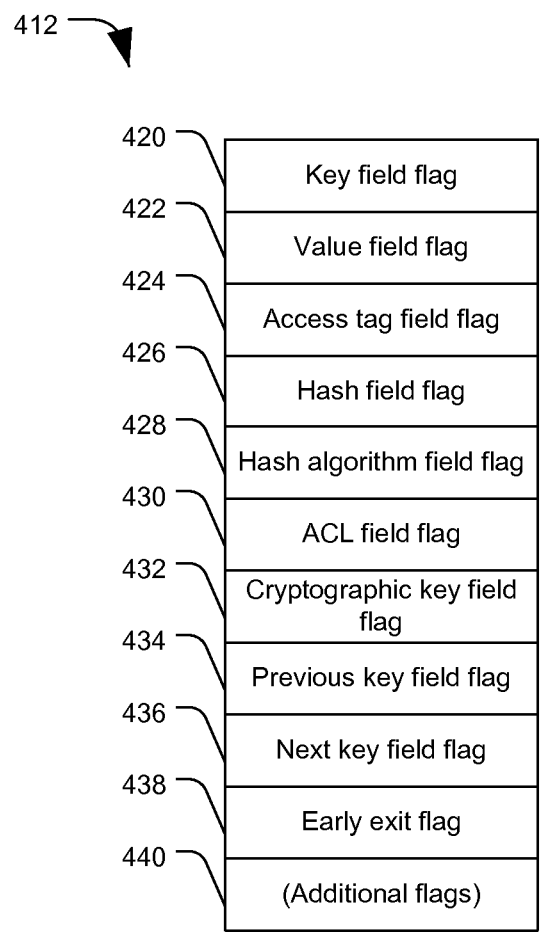

Each command can specify what fields of an object to return, for example using flags 412. FIG. 4B shows an example set of flags which may be included with commands. For example, flag 412 of FIG. 4A may include multiple flags, such as a flag for each field of a key/value object, and a command may specify which of all the fields described in relation to FIG. 3, or any other data or metadata fields, should be included in the response from the DSD. In the example of FIG. 4B, these flags include a key field flag 420, a value field flag 422, an access tag field 424, a hash flag field 426, a hash algorithm field flag 428, an access control list (ACL) field flag 430, a cryptographic key field flag 432, a previous key field flag 434, a next key field flag 436, an early exit flag 438, and addition flags 440 corresponding to other data or meta data field, or to other operational controls similar to the early exit flag 438. In some embodiments, all the flags may be included in commands as a single bit each, and toggled on or off with a 1 or 0 value. In other embodiments, only the desired flags may be included in a command at all.

Returning to FIG. 4A, in another example, a Get command may have a key specifying mechanism (not shown), which can direct the DSD to get the object for the specified key, get the first object preceding the specified key, or get the first object following the specified key. A get next or get previous command may be a modification of a basic get command, or they may be separate commands.

In some embodiments, commands such as Put, Get, and Delete may be modified with quality of service (QoS) qualifiers 404. QoS qualifiers may allow the client issuing the commands to specify a level of service, reliability, or performance of the associated command. In other words, QoS qualifiers may provide an indication to a device as to how methodically or comprehensively the associated command is to be performed.

In an example embodiment, QoS qualifiers 404 for Put commands may include: write-back, power-safe write-back, write-through, and verified. A write-back Put can complete (e.g. the data storage device can return an indication that the associated user data has been successfully stored) before the information is stored to a non-volatile media. For example, the DSD may return a complete notification once the data is received and stored to a volatile cache memory. A power-safe write-back Put can complete before information is stored to non-volatile memory, but the data may be guaranteed to be saved to non-volatile memory if power is lost. For example, the DSD may have a battery backup or other power feature allowing a volatile cache to be stored to a nonvolatile memory in the case of a power loss. A write-through Put may not complete until the associated information is stored to non-volatile memory and power safe. For example, a write-through Put command may instruct a DSD to store the associated data synchronously to a volatile cache and to a non-volatile disc. A verified Put may not complete until information is stored to a non-volatile media and power safe, and has been successfully read from media. For example, this may involve writing the data to a nonvolatile media, then reading it again to verify that it was saved without errors.

In some embodiments, QoS qualifiers 404 for Get commands may include: normal, scan, repair, and data quality. A normal Get may use normal servicing, which may favor returning failure instead of spending seconds or hundreds of milliseconds on attempting to recover data. Normal servicing may include attempting fast recovery methods, such as a simple retry (e.g. letting a disc spin another revolution for a second read attempt). This may be used when a host would prefer fast failure over slow success, such as where the data may be available from another location. Recovery methods and time spent executing commands by the DSD may be limited or modified by time qualifiers included with the commands as described herein, such as a time limit value or an early exit flag. A scan Get may use methods that validate the value based on the stored hash or validate the media to a tighter threshold of recoverability, and in some embodiments no data may be returned. For example, this may be similar to an internal media scan, where a DSD may be instructed to scan the sectors containing the object specified in the Get for errors or unreliability. This may be used in conjunction with iterators to scan a series of objects; for example Get scan [key Min] to Get scan [key Max]. For example, the scan operation may iterate through each object using a for loop or similar function. A repair Get may use all possible recovery methods including heroic recovery (e.g. the DSD doing everything it can to recover data, such as retries, reading slightly off-track, different EC power, outer code recovery, sync mark dithering, etc.). The repair Get may be used when no replica or backup of the data is easily available. A data quality Get may return a hash of the value field rather than or in addition to the data itself. The data quality qualifier may be used instead of or in conjunction with flags to return metadata fields. For example, a data quality Get may instruct the DSD to retrieve the value field of the specified object, perform a hashing algorithm on the value, and return the hash, while including a hash flag may instruct the DSD to also return the value stored in the hash metadata field (310). For example, the hash of the value field may be checked against the stored hash metadata field (310), for example in order to check for data quality or integrity. The command set may be configured to work with any specific hash algorithm, or more than one may be supported. For example, the hash algorithm in use may be determined by the size of the hash value in bits, as different hash algorithms may output hashes of different sizes. Each object may include a hash algorithm metadata field to specify which algorithm to use on the object's value field.

In some embodiments, QoS qualifiers 404 for Delete commands may include: normal, cryptographic erase, media erase, or empty. A normal Delete may direct that the object specified by a key be removed from access tables. A cryptographic erase Delete may guarantee that a cryptographic key used to decrypt an object be securely erased so that even if the media at which the value was stored is accessed, the data cannot be decrypted. A media erase Delete may change the state of the storage media to accomplish the delete. For example, with a Flash device a media erase Delete may require that the erase blocks on which the object was stored be cleared of data, such as by moving all valid data from the blocks and erasing all data from the blocks. For a disc memory, a media erase Delete may comprise overwriting the sectors storing the specified object with other data. For a tape device, a media erase Delete may comprise subjecting the blocks or tracks storing the specified object to an erase field. An empty Delete may involve replacing the value field of the object with a null value or 0-byte value field, while preserving the object itself. This can leave a "tombstone" as an abstraction for a key/value object, leaving an identifier that the key has been used or is reserved. In some embodiments, "empty" could be another qualifier separate from a Quality of Service qualifier. The empty qualifier could be combined with other qualifiers, for example allowing an empty cryptographic erase or media erase Delete operation. In some embodiments, a Put command with a null or 0-value field could also be used to create a tombstone key/value object.

In some embodiments, commands such as Put, Get, and Delete may also be modified with specific data integrity qualifiers 406. Data integrity qualifiers may allow the client issuing the commands to specify, request, or check a hash value for an object to determine the integrity of the stored data. As discussed, key/value objects can have a hash of the data field according a client-specified hashing algorithm. The hash, if it exists, can be verified on Puts and Gets, Deletes, or other operations. For example, a client may run the data of an object, or the "value" field, through a hashing algorithm that produces a hash value. Whenever the object data field is put through this hashing algorithm it should produce the same hash value, while a different set of data, or the same data in a different order, is likely to produce a different hash value. The hash value can therefore be used to verify that the object data field has not been altered or misread during data storage or transmission. The hash value may be for the entire object data field regardless of size, as opposed to a hash value based on a specific-sized chunk of data (e.g. a 512-byte sector). A client may transmit a hash value of an object along with the data payload of an object, and a DSD may store the hash value as part of or associated with the object. In some embodiments, a client may only transfer a data payload for the object, and the DSD may compute a hash value for the data payload.

Data integrity 406 Put qualifiers may include verify, write-back verify, or write-through verify. For example, on a verify Put command, a DSD may run the data field through the hashing algorithm and compare it against a received hash value to verify the data was not corrupted during transmission. A write-back verify Put command may including writing the data to a volatile memory, then reading the data back, hashing it, and comparing it with a received hash. With a write-through verify Put command, the object could be stored to a non-volatile memory and then read back, and the read back data field put through the hashing algorithm and compared against a received hash or the hash metadata field to verify that it was stored correctly. In some embodiments, the data integrity qualifier may not specify the type of verification, and instead the type of data integrity verification may depend on selected QoS modifiers. For example, selecting a Put write-through QoS modifier and a data integrity modifier may result in writing the data to a nonvolatile memory, then reading that data back and running it through a hash algorithm. In some embodiments, write-back or write-through verification may be selected as data integrity qualifiers without requiring a specific QoS modifier, or certain data integrity modifiers may only be valid in conjunction with certain QoS modifiers. Other configurations and embodiments are also possible.

Data integrity 406 Get qualifiers may include verify, hash fetch, and hash media data integrity qualifiers. A verify Get may direct the data storage device to perform a specified hash algorithm on the data field and compare the result against the hash value of the data stored as metadata. In another embodiment, a verify Get command may include a hash of the requested data, and the data storage device may hash the object data field and compare the results against the received hash before returning the requested data or the results of the hash comparison. A hash fetch Get may request that the hash of the data field of the specified object be returned. This may be a stored hash (such as saved as part of a Put command), or a hash of a cached copy of the data field, rather than a hash calculated from fetching the value field fetched from the key/value object storage media. A hash media Get may request the hash of the stored data field is returned, such as a hash calculated from fetching the value data field from the non-volatile memory or storage media where the value data field is stored.

Delete commands may also include data integrity qualifiers 406. For example, the delete command may include a hash of the object to be deleted, and the delete operation only proceeds if the received hash matches the hash of the target object. In another embodiment, a Delete operation may include the "empty" QoS modifier and direct that the data field and metadata of the target object be replaced with a Null value. A verify modifier may direct that the DSD may return a hash of the Null value data field to verify that the object was properly "emptied."

In some embodiments, basic commands may also be modified with access control qualifiers 408. The access control feature set may include a "version" or "access tag" metadata field for each key/value object. The version field can be used to regulate access to data by multiple hosts or clients, to keep data synchronized. A Get may return the data field of the specified object and the object's version field. Access control qualifiers on a command may direct the DSD to consider access tags or other factors during the execution of a command.

In some embodiments, an access control qualifier may specify one or more access tag values associated with the object of the Put command, and the DSD may compare a received access tag value against the access tag of any corresponding existing objects. Similarly, in some embodiments Get, Delete, or other operations may only succeed if a designated access tag value matches the access tag value of the target object. An example of this embodiment may be seen in FIG. 5A. In another embodiment, access control qualifiers for a Put or other command may include "unrestricted," "new key," "unspecified version," and "specified version" qualifiers. Unrestricted may mean the Put can succeed without regard to whether an object with the key specified in the Put already exists, or the object's access tag field value. A new key access control qualifier may direct that the Put can succeed only if the specified key does not currently exist. An unspecified version access control qualifier may direct that the Put can succeed only if the specified key does exist, regardless of the version field value. A specified version access control qualifier may direct that the Put can succeed only if the specified key exists and its version is as specified. An example of this embodiment may be seen in FIG. 5B.

Figure 5A:
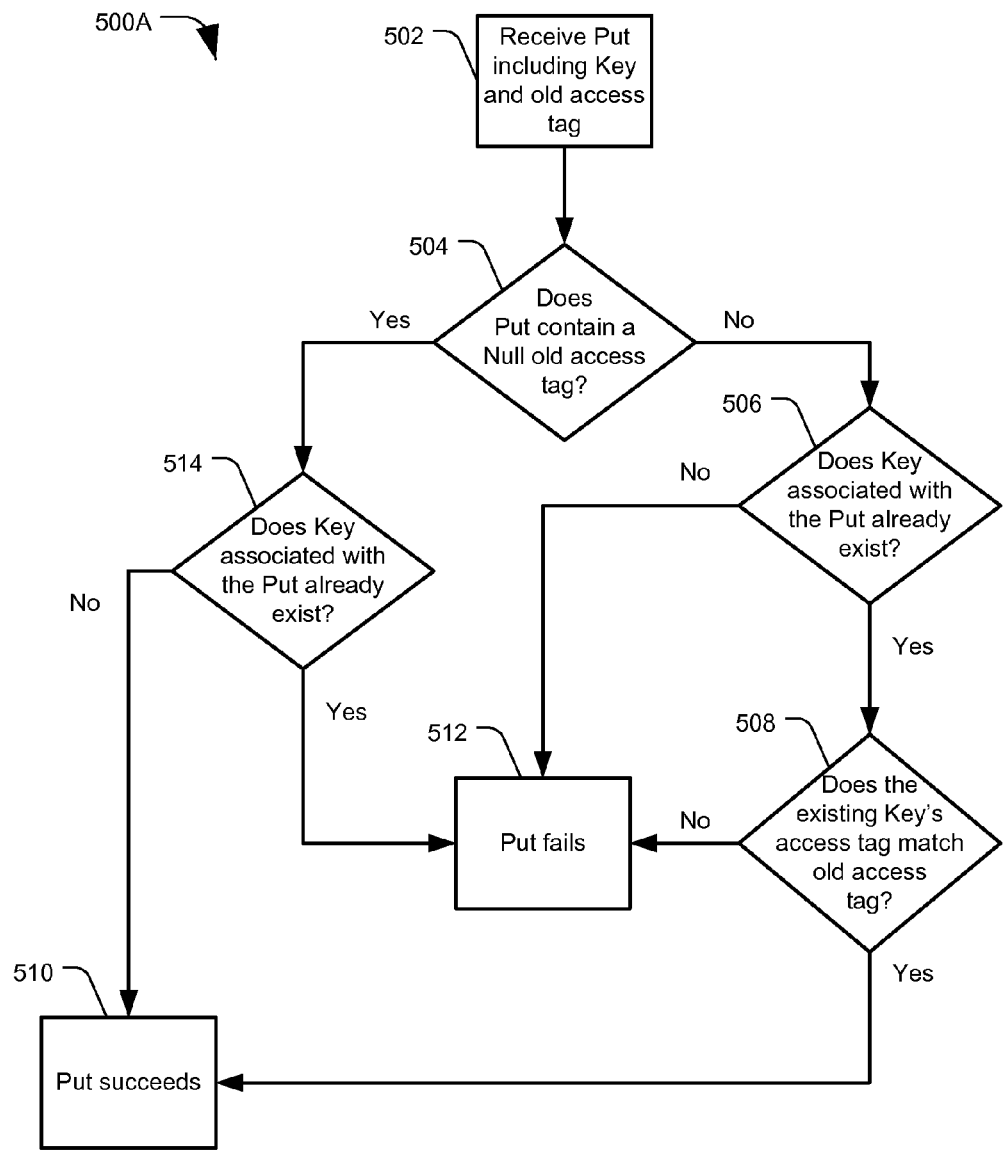
FIG. 5A is a flowchart of another illustrative embodiment of a method employing object-based commands with quality of service identifiers.

For example, basic commands 402 such as Puts may have a key field identifying the object involved in the Put, a data field indicating the data to be saved, and appended access control qualifiers 408 such as an old-access tag and new-access tag parameter. FIG. 5A depicts an example embodiment of a method for performing a Put under the described command set. The method 500A may include receiving a Put command including a key and an old access tag parameter, at 502. Hosts may select the value of the key field for objects they wish to store, including for new objects, and the old-access tag parameter can prevent multiple Hosts from trying to store objects to the same key without synchronization. Puts associated with an existing object, such as storing modifications to a file, can include a value for the old-access tag parameter. A Put with a null old-access tag succeeds only if a key/value object with the specified key does not already exist. Accordingly, the method 500 may include determining if the Put contains a null old access tag value, at 504.

If the Put does not contain a null old access tag, at 504, the method may include determining whether the key associated with the Put already exists, at 506. If the key does already exist, at 506, the method may involve determining whether the existing key's access tag matches the old access tag from the Put command, at 508. A Put with a non-null old-access tag succeeds only if the designated key does already exist, and the existing Key's access tag is equal to the old access tag. If these conditions are met, at 504-508, then the Put succeeds at 510 and results in a new or updated version of the object with an access tag value of new-access tag, which may also be included with the Put command. For example, a new access tag could be set as a timestamp of when the Put command was set, an increment of the old access tag value, a vector clock value, otherwise randomly generated, or selected in another manner. If the key associated with the Put does not already exist at 506, or if the existing Key's access tag does not match the old access tag value associated with the Put at 508, the Put fails at 512.

For example, assume two clients, Client A and Client B, access the same object with two respective Get commands, and receive the object's access tag value. Client A modifies the object and issues a Put command with the key, the modified data field, the old-access tag parameter set to the object's access tag value, and a new-access tag parameter designated by Client A. The object is saved with the same key, the modified data field, and an access tag equal to Client A's new-access tag value. Client B now modifies the object and issues a Put command, with an old-access tag value set to the previous access tag value of the object. Because Client B's old-access tag value does not match the object's current access tag value after it was changed by Client A, Client B's Put command does not succeed. If it did, Client B's changed data field would replace the object, and Client A's changes would be lost. Client B can issue a new Get to retrieve the current object data field including Client A's changes and the new access tag value, incorporate Client B's changes, and issue a new Put command. This method is able to synchronize independent changes to an object without any communications between the clients beyond the access tag associated with the object. In this manner, a client may only need to retain the access tag value for an object while the object is open and being modified, and does not need to retain the access tag value otherwise. A key/value object data storage device may need to retain the current access tag for every object.

Returning to FIG. 5A, if the Put does contain a null old access tag at 504, the method 500 may include determining if the key associated with the Put already exists, at 514. While this may be the same determination as performed at 506, the results of these two determinations may result in different outcomes depending on the determination results at 504. For example, if the Put does contain a null old access tag, at 504, and the key associated with the Put does already exist, at 514, the Put may fail at 512. This would result if a client was trying to store data using a key that already exists, but the client did not include an old access tag, indicating the client may not be aware of the existing object and its associated access tag value. By having the Put fail, this prevents an old object from being replaced with a new object. If the Put contains a null old access tag, at 504, and the key associated with the Put does not already exist, at 514, the Put may succeed at 510. This may involve creating a new key/value object and associated metadata.

Figure 5B:
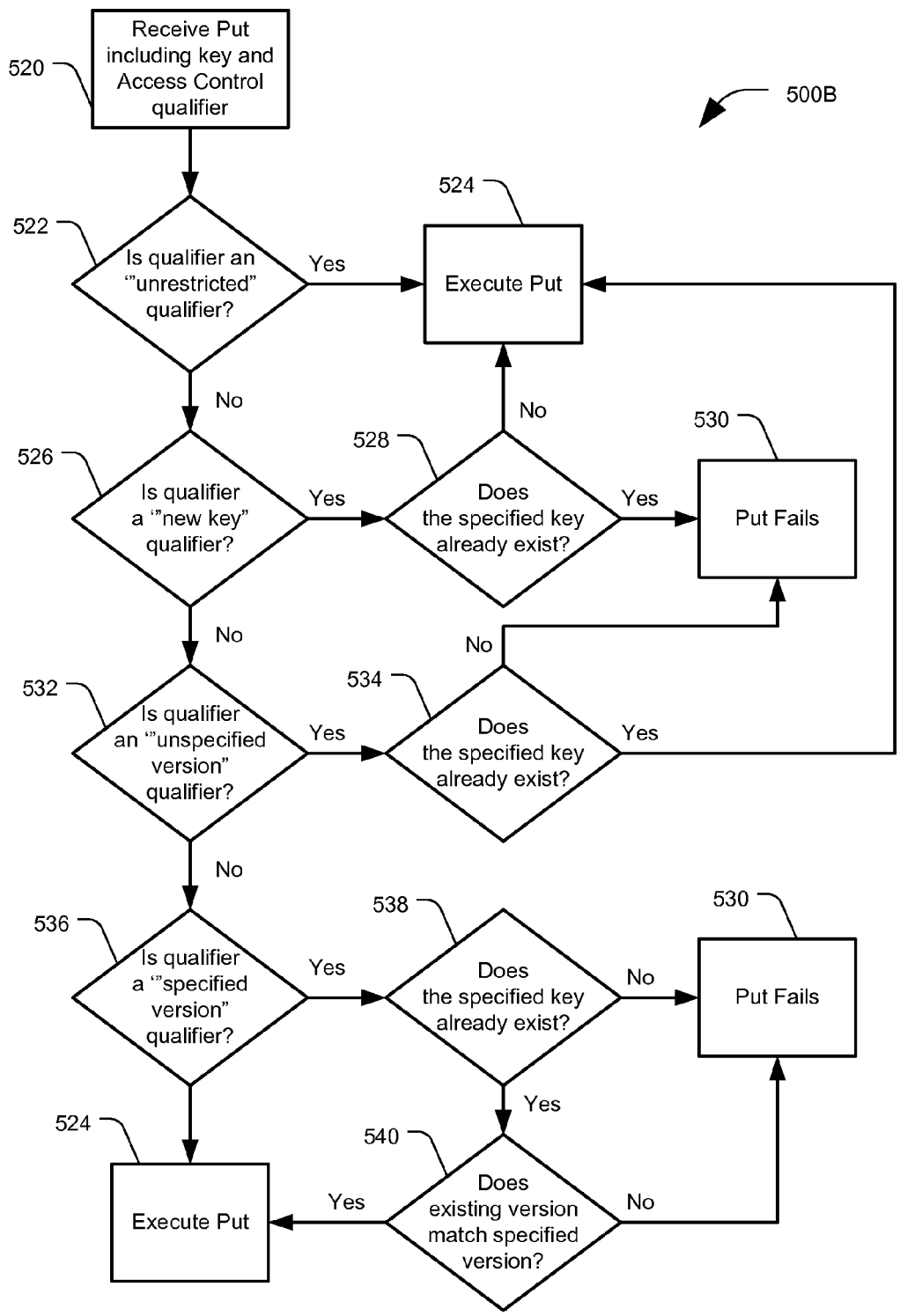
FIG. 5B is a flowchart of another illustrative embodiment of a method employing object-based commands with quality of service identifiers.

Turning now to FIG. 5B, another example embodiment of a method for performing a Put under the described command set, including an access control qualifier, is shown and generally designated 500B. The method 500B may including receiving a Put command including a specified key and an access control qualifier, for example "unrestricted," "new key," "unspecified version," or "specified version" qualifiers, at 520. With some qualifiers, such as a specified version qualifier, the command may also include a version or access tag value associated with the specified key.

The method may involve determining if the access control qualifier is an "unrestricted" qualifier, at 522. An unrestricted qualifier may indicate that an operation can succeed without regard to whether an object having the specified key already exists, or the object's access tag field value. In some embodiments, a client issuing the command may not include an access control qualifier, and the command may be treated like an "unrestricted" command. If the access control qualifier is an unrestricted qualifier, the Put may succeed, at 524. Depending on implementation, the client issuing the Put may specify a new access tag value to be used for the stored object, or the data storage device may generate an access tag value for the object. This may apply whenever a key/value object is stored.

If the qualifier is not an unrestricted qualifier, at 522, the method may involve determining if the access control qualifier is a "new key" qualifier, at 526. A new key qualifier may direct that the Put can succeed only if the specified key does not currently exist. Accordingly, if the qualifier is a new key qualifier, the method may involve determining if the specified key already exists, at 528. If not, the Put may succeed, at 524. If the specified key does already exist, the Put may fail, at 530.

If the qualifier is not a new key qualifier at 526, the method may involve determining whether the access control qualifier is an "unspecified version" qualifier, at 532. An unspecified version access control qualifier may direct that the Put can succeed only if the specified key does exist, regardless of the version field value. Accordingly, if the qualifier is an unspecified version qualifier, at 532, the method may involve determining whether the specified key already exists, at 534. If it does, the Put may execute, at 524. If the specified key does not already exist, the Put may fail, at 530.

If the qualifier is not an unspecified version qualifier, at 532, the method may involve determining if the access control qualifier is a "specified version" qualifier, at 536. A specified version access control qualifier may direct that the Put can succeed only if the specified key exists and its version is as specified. Accordingly, if the qualifier is a specified version qualifier, the method may involve determining if the specified key already exists, at 538. If it does not, the Put may fail, at 530. If the specified key does exist, at 538, the method may involve determining if the version field of the existing object matches the specified version of the Put command, at 540. If they do not match, the Put may fail, at 530. If the version values do match, at 540, the Put may succeed, at 524. In the depicted embodiment, if the qualifier is not a specified version qualifier, at 536, or any other qualifier, the command may be treated like an "unrestricted" qualifier and the Put may succeed, at 524. In another embodiment, if the access control qualifier is not a recognized qualifier, the Put may fail, at 530.

In some embodiments, access control qualifiers may not be necessary or used for Get or Delete commands. In some embodiments, Get or Delete operations may include access control qualifiers, and may only succeed if the target object has the expected access tag value. For example, a host may keep track of an access tag for each object based on the access tag value as of the most recent access. In another embodiment, a host may request a current access tag value for an object, for example for use by a consuming process, before performing a Delete operation when the process has completed. If the object has been modified in the meantime, the Delete may fail. For instance, the object may represent a shopping cart of a website, and the consuming process may be the billing method. If everything has been billed then the cart can be emptied or deleted, but if new items have been added to the cart then the billing method needs to resolve the additions, and the object should not be deleted. Other embodiments are also possible.

Another feature set of the command set may include the Secure Multiple Tenant feature set, where 'tenants' may refer to users, hosts, clients, associated groups of users, or similar accessing entities. Multiple tenants may be sharing the hardware including the API of the present disclosure. The Secure Multiple Tenant feature set may have authentication on every access, and a separate encryption key for each tenant. For example, data stored by a tenant may be encrypted with that tenant's encryption key, and tenants may only be able to access data that is unencrypted or encrypted with their encryption key. In some embodiments, a user's encryption key may designate a level of access to the system, or a category of objects that the tenant may access. For example, a storage device employing the command set may store an encryption key for each tenant. A tenant may need to be authenticated each time it accesses the device, for example by logging in with a user name and password. Once a tenant has been authenticated, any data stored to the device by the tenant may be encrypted with that tenant's corresponding encryption key, and data retrieved by the tenant may be decrypted with the tenant's encryption key.

Figure 6:
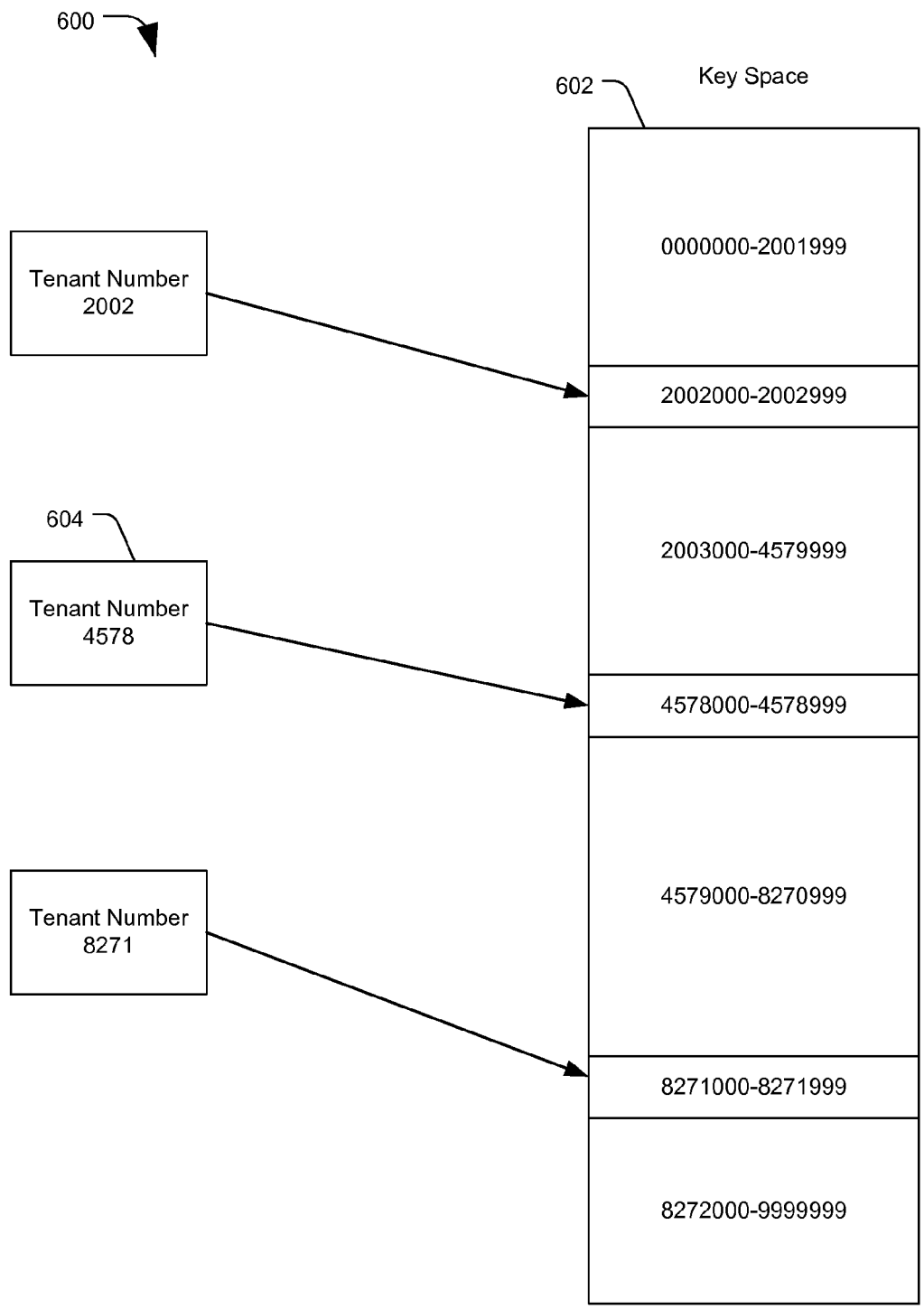
FIG. 6 is a diagram of another illustrative embodiment of a system employing object-based commands with quality of service identifiers.

Turning now to FIG. 6, a diagram 600 of another illustrative embodiment of a system employing object-based commands with quality of service identifiers is shown. In some embodiments, a system may employ key spaces, which may be a range of keys, for example from 4,000-7,999, inclusive. Tenants may be limited to using keys in a certain range (e.g. they can only create or access objects with keys in the given range), as opposed to having access to objects with any key. These access rights may be maintained in an access control list (ACL). For example, each tenant may have a tenant number, which may be based on the tenant device's serial number, assigned by the storage device, or implemented in another manner. The tenant number may correspond to the high-order bits of the values of key fields, and the key space accessible by the tenant may be limited to keys starting with bits matching the tenant number. In the example of FIG. 6, the values of key fields may include 7-digit values, resulting in a total key space 602 for the system ranging from 0000000 to 9999999. A tenant 604 with tenant number 4578 accessing a system employing key spaces may only be able to create or access objects with keys from 4578000 to 4578999, inclusive.

Other key size and key space configurations are also possible. For example, a tenant may comprise a group of host devices associated with a specific unit of a company, and any of those host devices can access a key space intended for that unit, and no other key spaces. A system may employ unrestricted "public" spaces in addition to private key spaces, such that any tenant can access the public key spaces but only specific tenants can access the private key spaces. The key space system can be combined with the Secure Multiple Tenant feature set discussed herein. For example, objects in a tenant's key space may be encrypted and decrypted with the tenant's encryption key. Objects in public key spaces may not be encrypted and decrypted with the encryption key.

It may be noted that the example qualifiers and features need not be mutually exclusive, and can be simultaneously appended to commands. For example, a client may issue a command: "repair (QoS qualifier) hash media (data integrity qualifier) Get [key] [tenant's encryption key]"; or a command of "write-through (QoS) Put [key] [value] [value hash] [old-access tag] [new-access tag] [encryption key]." In some embodiments, some or all of the qualifiers or extra fields may not be required. For example, a DSD may have a default Put operation if no QoS qualifier is specified, no data integrity qualifier or hash is needed, and no encryption key is needed.

The command set API may also include commands and guidelines for organization, control, migration, or tracking of objects based on keys and ranges. As stated, keys may be used as a tracking indicator for objects, and may be looked up using search trees or in access tables stored on a device. For the purposes of key ranges, keys may have a one-dimensional ordering based on the numeric representation of the key. For example, each key may be a number of bits within a size range, the bits indicating a numerical value representation (e.g. keys can have a value from 0 to MaxValue, based on the permissible key size range). Accordingly, a device employing the API may maintain a mapping table to track objects organized by each object's numeric key. In some embodiments, rather than being arranged by numeric key, objects may be arranged by another collation organization scheme, such as alphabetizing if the values of the key fields correspond to alphanumeric characters. In such embodiments, different geographical regions may collate in different orders based on differences of alphabet, for example.

Figure 7:
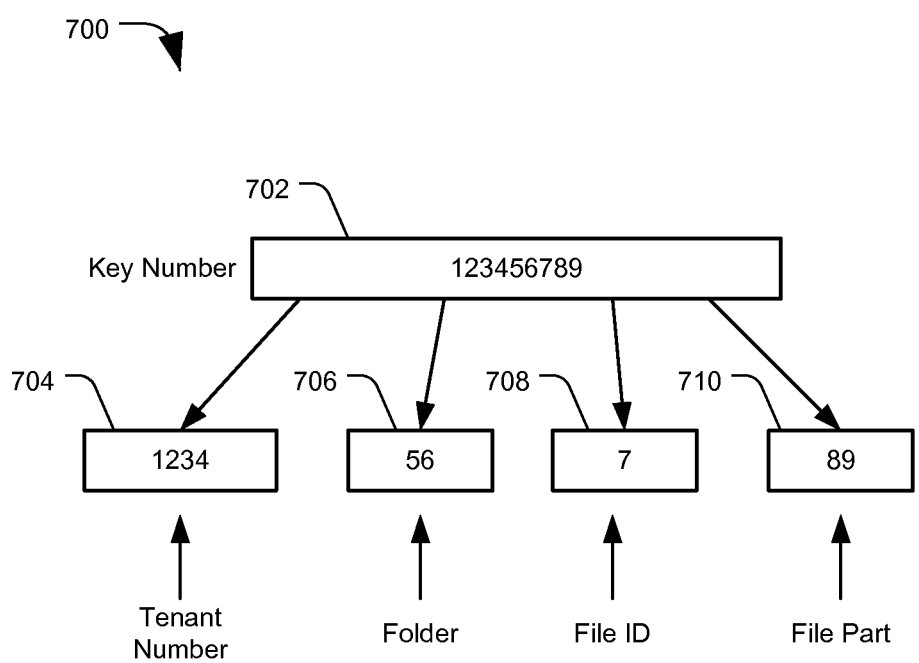
FIG. 7 is a diagram of another illustrative embodiment of a system employing object-based commands with quality of service identifiers.

As discussed, keys for objects may be selected by a client system, and may be any value so long as the keys are within a predefined size limit. FIG. 7 is a diagram of another illustrative embodiment of a system employing object-based commands with quality of service identifiers, generally designated 700. FIG. 7 depicts an example client-selected key 702. The size limit for keys may be large enough that keys are sparse with a low likelihood of collisions (e.g. two clients attempting to use the same key). Although a nine-digit key 702 is depicted in FIG. 7, other size options are also possible. For example, each key may be 256 bits in length. In some embodiments, keys may be based on an organizational hierarchy scheme, with different bits or digits selected by a host to have logical structure or organizational meaning to the host. For example, some bits of the key may be unique by client (e.g., the first four bits of the key may be a client identifier). Other bits may identify directories, sub-directories, categories, file associations, or have other meanings.

In the example of FIG. 7, the first four digits 704 of the key number 702 may identify the tenant or host, such as based on a serial number, production date, manufacturer, or other information, or a value assigned to the tenant by a data storage device or a storage system manager. The next two digits 706 may identify a folder, partition, or other logical or physical location in which files may be stored, according to the file system structure of the tenant. The next digit 708 may identify a file ID for a particular file. The final two digits 710 may identify a file part or "shard" of a particular file, in embodiments where a file is fragmented into sections. Together, this key number 702 for an object may have logical meaning to the tenant, identifying the originating tenant, a folder of the tenant's file system structure in which the object is stored, and a file ID and file part to identify the object within the folder. Other data may also be used to select a key number or be included as bits of the key number, such as additional sub-folders, object creation date, a last modified date, a user ID of the user which created the file, other information, or a combination thereof. This is just one example implementation of selecting a key; it is also possible to use other implementations, or simply to randomly generate a value of the key for each object.

In some embodiments, the value of the key or a subset of the key could be a hash of another value. For example, the key could be a hash of the value data or some other data related to the object. A key generated based on performing a hash algorithm may be generated by either a host or tenant, or by the target data storage device. With large enough keys (e.g. a 256-bit key) and a large enough value on which to perform a hashing algorithm, mathematically the likelihood of hash collision may be astronomically small. If the key was a hash of the object value, a collision may indicate that the objects are the same, possibly the same data coming from multiple clients. In such embodiments, it may be efficient to only store one copy of the object and a metadata counter for the number of different clients that have stored that object. For example, every time a collision occurs for an object, the counter may be incremented. When a delete is received for the object, the counter may be decremented, and only truly deleted when the counter reaches 0. In such embodiments, the API command set may include commands such as "get counter," or an enhanced delete command that removes the object regardless of the current counter value. A key selected based on a hash of the value data field may result in a new key or new object being created when the value field is changed.

Figure 8A:
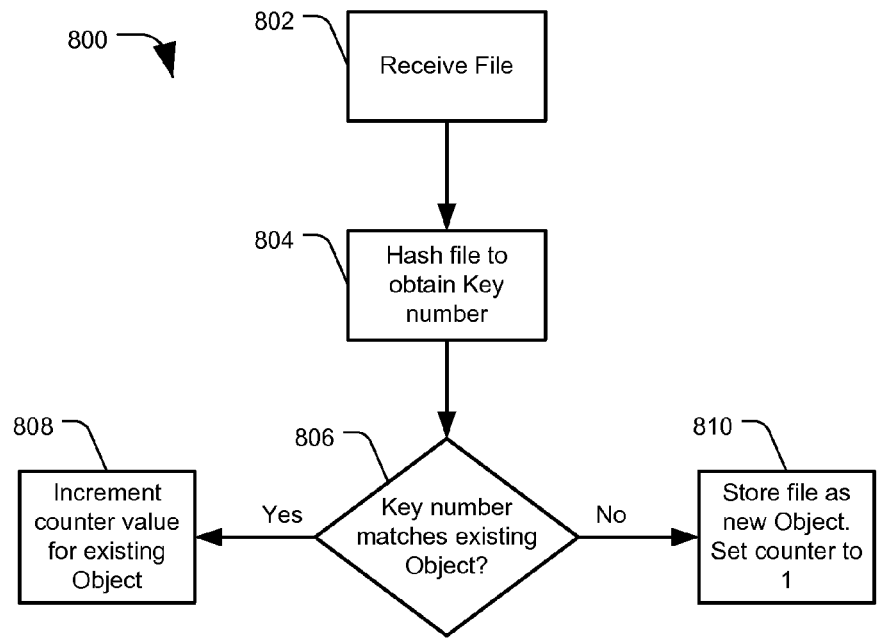
FIGS. 8a and 8b are flowcharts of illustrative embodiments of methods employing object-based commands with quality of service identifiers.

Turning now to FIG. 8A, a flowchart of an illustrative embodiment of a method employing object-based commands with quality of service identifiers is depicted and generally designated 800. In particular, FIG. 8a shows an example method of storing an object based on a key generated using a hashing algorithm. The method may involve receiving a file to be stored at a data storage device, at 802. The method 800 may perform a hash algorithm on the file to obtain a value for the key to identify the object. In some embodiments, the hash may be performed by a tenant, and the hash of the file and the unhashed file may both be sent to the data storage device (DSD). In other embodiments, the file alone may be sent to the DSD, and the DSD may perform the hash algorithm on the file. When the hash is performed by the DSD, it may return the hash to the tenant along with an indication that the storing operation has been successful, so that the tenant knows the value for the key for the object. In other embodiments, the tenant and the DSD may both know the appropriate hash algorithm, and can therefore generate the value for the key independently.

After determining the value for the key by performing a hash algorithm, the method 800 may include determining whether the key matches a key for an existing object, at 806. If a matching key does exist, the method 800 may involve incrementing a counter value for the existing object, at 808. This counter may be used to determine a number of "instances" of the same object that have been saved, rather than saving multiple copies of the same object. If no existing object has a matching key at 806, the method 800 may involve storing the received file as a new object, and setting the counter to 1, at 810.

Figure 8B:
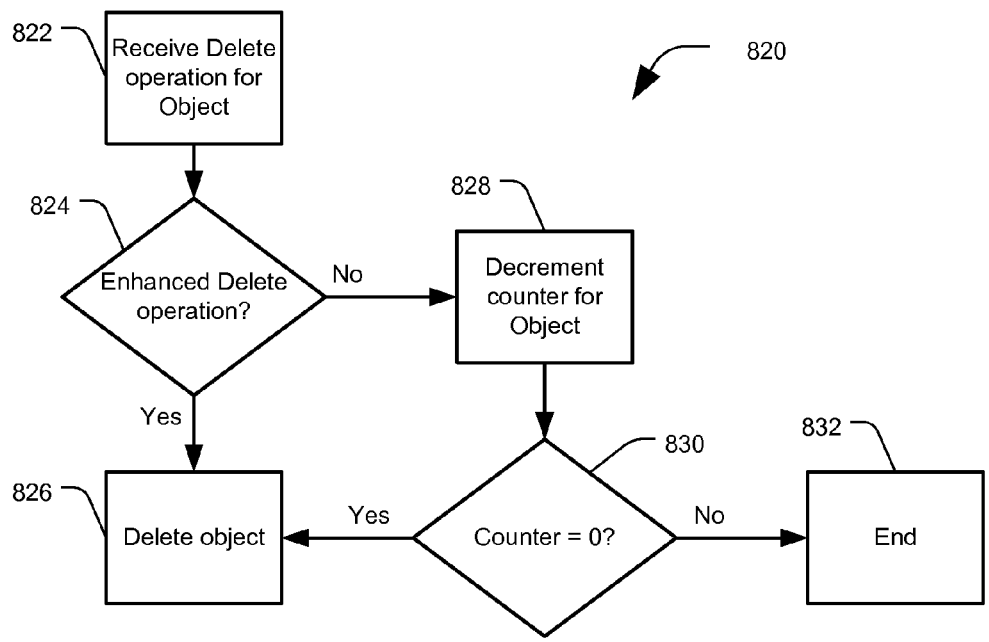

FIG. 8b depicts a flowchart of an illustrative embodiment of methods employing object-based commands with quality of service identifiers, generally designated 820. In particular, FIG. 8b depicts an example method of performing a delete operation for an object which may be stored with an "instance counter" identify a number of instances that have been stored of the target object. The method 820 may involve receiving a delete operation for a specified object, at 822.

The method 820 may involve determining whether the delete operation is an enhanced delete operation, at 824. An enhanced delete operation may direct a storage device to delete an object regardless of the number of instances which have been stored. If the operation is an enhanced delete operation, the method 820 may involve deleting the object, at 826. If the operation is not an enhanced delete operation at 824, the method may involve decrementing an instance counter for the object, at 828. A determination may be made of whether the instance counter has reached "0," or some other deletion threshold, at 830. If the counter has reached 0, the method may involve deleting the object at 826. If the counter has not reached 0, the method may end at 832.

In some embodiments, the API may include an "enhanced Put" operation to increment an instance counter, rather than managing by hash collisions. For example, a client could keep a list of hashes for objects already stored. Rather than sending a Put containing the entire data field of an object which is already stored, an enhanced Put may only send a command to increment an instance counter for the object. In an example embodiment, a client may be an e-mail system which may keep track of e-mails for different accounts, with some accounts having duplicates of the same e-mail. This system may benefit from not storing duplicate e-mail copies, even if the client system needs to track hashes for existing objects. In an embodiment, duplicate objects may be determined at a deduplication layer of a system, which may convert a normal Put operation to an enhanced Put operation. Other implementations may also be used. In some embodiments, the "enhanced Delete" operation of FIG. 8B may only be implemented in systems with "enhanced Put" operations. In some embodiments, enhanced Delete may be usable without any determination of whether duplicate copies exist first, for example to ensure that a file is deleted whether or not multiple copies exist.

Regardless of the manner of key organization or key schema, the command set may include commands such as get_next or get_previous, which may return the next or previous key/value object, respectively, from a designated key, according to how the keys are organized under a collation algorithm. This may only return the next or previous key, rather than the value (e.g. data) of the next or previous object. In some embodiments, the command set may include get_next_key and get_previous_key commands to return the respective keys only, and get_next_object and get_previous_object to return data or metadata associated with the next or previous object based on the values of keys. The next and previous commands may be implemented to "wrap" to an opposite end of the key order "list;" e.g. going from a "highest" to a "lowest" key value on a get_next command, or from a lowest to a highest key value on a get_previous command. For example, issuing a get_next command and designating the last key according the organization scheme may be configured to return the first key according to the organization scheme. The command set may also include a get_key_list command to return a listing of existing values of keys, or a listing of keys following or preceding a specified key.

The command set may also include a Sync command for instructing a DSD to commit cached objects to non-volatile media. For example, a Sync command may direct a DSD to flush all "dirty" objects from the cache to a non-volatile memory, all objects over a specified key range, or one or more specified objects. A Sync command may include modifiers, such as time limit modifiers or Quality of Service modifiers, or other modifiers. For example, a verified QoS modifier may be included in the command, directing the DSD to store the specified data to a non-volatile memory, and then read the data back to ensure it was stored successfully. In some embodiments, Sync may be a modifier for other commands, such as Put commands or Delete commands which associate a null value with a given key, directing that the data be committed to non-volatile memory.

The command set may also include a Send command and Fetch command for object migration. Migration may involve moving data from one device to another device, such as when servers are upgraded or data is to be hosted at a new geographic location. The Send and Fetch commands may operate as peer-to-peer Put and Get commands. The Send method may generate a Put of a specified object to a specified destination (e.g. IP address of destination device). Send can make use of the peer-to-peer capabilities of an Ethernet interface, for example. The Fetch command may tell a device to issue a Get command to a specified destination device.

Another command of the API may include the Iterate method. The Iterate method may allow for methods or commands (e.g. Get, delete, etc.) to be applied to a subset of the objects based on keys. The subset may be specified by a range of values of keys. The Iterate method may be implemented as a command or as a qualifier or modifier for another command. The Iterate method can execute a specified operation on each key in the specified key range. Failures may be reported on a per-key or per-object basis in an open connection to the source of the Iterate operation. For example, a host issuing the Iterate command may receive a stream of responses corresponding to each key. In some embodiments, there may be no responses on successes and only responses on failures, or in others there may be no responses on failures and only responses on successes. As keys may be sparse, a specified key range of e.g. 1 to 1000 may only have one or two valid keys in the specified range, so the desired response dynamic may depend on the nature of the iterated operation. The Iterate command may have a final completion status that gets sent to a host on final completion, and in some embodiments the final status response may be the only response sent.

In some embodiments, the API may also allow for the use of a store access tag field as part of commands. In such embodiments, a data storage device or connected devices may each have its own access tag, which may be called the store access tag. A store access tag can be specified as a qualifier for each method or command, and the specified store access tag value must match the drive's store access tag value for the method even to be attempted. This can be similar to the object access tags, in that it can prevent synchronicity problems between clients and a drive.

For example, some systems of multiple devices can't be completely shut down, and must be upgraded to new software or firmware with rolling updates. Upgrades may make client software incompatible with the API system and the key/value information on a device if the software version numbers do not match. Therefore, it may be necessary to make sure a client and a device are using the same software or firmware version. In some embodiments, the store access tag used by devices in a system may be based on a version number of the API software currently being used by those devices. When all devices are on the same version, commands may be exchanged and executed without issue. If one device has been upgraded and another device has not, the store access tag values may not match, and commands may not be executed until both devices have updated to the same software version.

Figure 9:
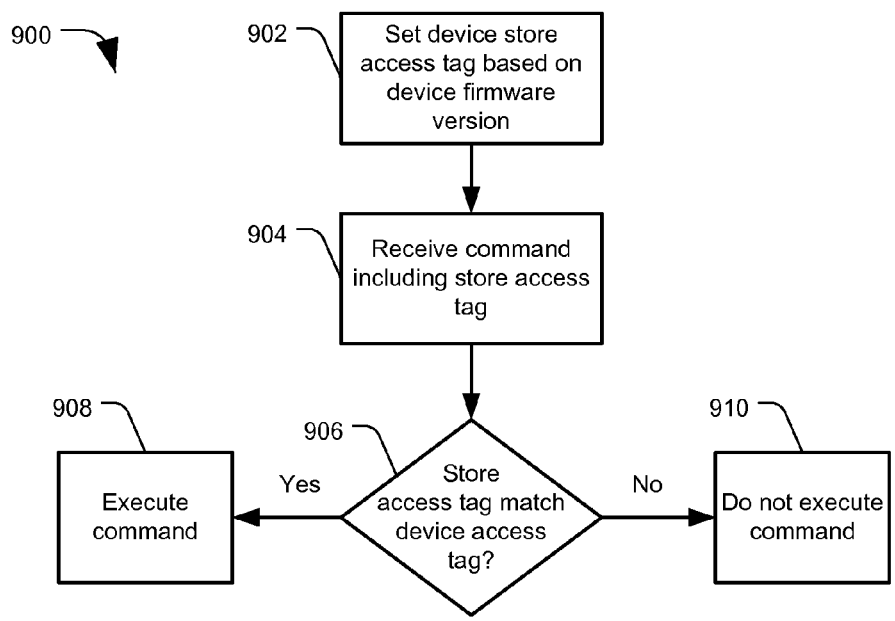
FIG. 9 is a flowchart of another illustrative embodiment of a method employing object-based commands with quality of service identifiers.

FIG. 9 depicts a flowchart of another illustrative embodiment of a method employing object-based commands with quality of service identifiers, generally designated 900. The method may involve setting a device's store access tag based on a current version of the API software or firmware installed on the device, at 902. In some embodiments, the method may involve setting the device's store access tag based on the organization of the key space, for example if how the key space is organized changes as part of an update. This may be performed for each device connected in a network or other system of devices which communicate using the API. The method 900 may include receiving a command including a store access tag value, at 904. For example, a data storage device (DSD) may receive a command from a connected host device. The method 900 may involve determining whether the store access tag received with the command matches the store access tag of the receiving device, at 906. If the access tags match, the method may involve executing the command, at 908. If the access tags do not match, the method may involve not executing the command, at 910.

The API may also support the use of tenant access tags, which may also be used to regulate communications and commands between devices in a network. Tenant access tags may be used in addition to or instead of store access tags. A data storage device may maintain a list of tenant access tags for each tenant that is allowed access to the device, for example in a table along with authentication information like a security password for the tenant and allowed actions for the tenant. Each tenant or a cluster manager may also maintain a tenant access tag value for each tenant. A tenant access tag may be updated as part of a security or software update, for example. In order for commands to be executed, the tenant access tag included with a command may need to match the tenant access tag stored on the storage device.

For example, a cluster manager may instruct a device to update the tenant access tags for each tenant as part of a system update. Accordingly, the device may only service commands originating from tenants that have been properly updated. In another embodiment, a cluster manager may set the tenant access tag for a tenant or in a device list to a bad tenant access tag until a proper component is updated, so that commands during the update will fail. In another embodiment, an updated tenant may send a request to a device that has not yet updated its list of tenant access tags, so the request may fail until the device has updated its list. If a mismatch is detected, a cluster manager may be notified so that the mismatch can be addressed, for example by updating a component.

Figure 10:
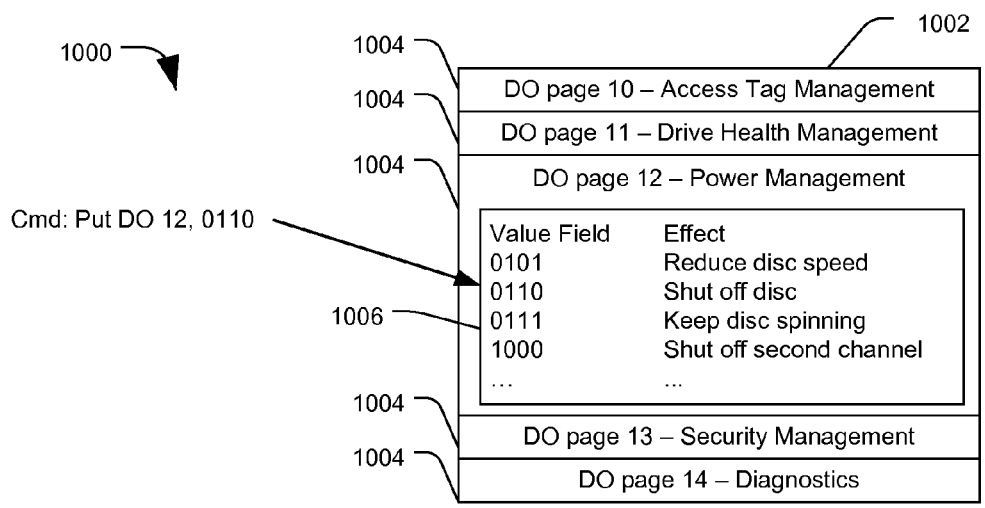
FIG. 10 is a diagram of another illustrative embodiment of a system employing object-based commands with quality of service identifiers.

Turning now to FIG. 10, a diagram of another illustrative embodiment of a system employing object-based commands with quality of service identifiers is depicted and generally designated 1000. The API may include other management control methods and parameters in addition to the commands and methods described above. The API may include control methods that do not interact with key/value object pairs, but rather with the state of the drive. In some embodiments, these control methods may transport instructions by using a device operation (DO) number or value, sometimes called a log number. DO numbers can be defined as a special class of keys in which the values of the keys have semantic meaning to the drive, and may possibly influence drive behavior, as opposed to regular keys in which the values are a sequence of bits without any semantic meaning to a DSD. For example, as shown in FIG. 10 a device may have a DO table 1002, with instructions or device behavior corresponding to each DO number on the DO table 1002. In the example of FIG. 10, the DO table 1002 may have multiple pages 1004, with each page including a number of commands 1006 directed to controlling behavior of the DSD. The different pages may be directed to different categories of device functions, such as access tag management, drive health management, power management, security management, diagnostics, or other types of commands.

Clients may send the DO instructions to a DSD in the form of an object-based instruction, such as a Put. In some embodiments, the DSD can determine whether the designated key has semantic meaning, and perform the DO instruction accordingly. For example, a range of values of keys in the key space may be reserved values of keys for device operation numbers, such as for DO pages 1004 or DO commands 1006. In some embodiments, the command may specifically identify the key as a DO number.

In the example embodiment of FIG. 10, a DO instruction may be sent in the form of a Put command, but instead of providing a key field of an object, the command may identify a DO page 1004; and instead of providing and a value field of an object, the command may provide a command number 1006 of an operation on the DO page 1004. For example, the DSD may receive a command of "Put DO 12, [value]", where 12 may be a DO page for power management, and the [value] field may be parsed by the device, e.g. to determine what power management operation to perform. In FIG. 10, the [value] field is shown as a 4-bit value of 0110. The drive may then look up DO page 12, and find the command under DO page 12 corresponding to the bit sequence 0110; in this case, a command to spin down and shut off the disc. In some embodiments, DO values may refer to the DO page number, the values corresponding to operations in a DO page, or a combination thereof. Other embodiments are also possible.

As stated, management control methods may include store access tag and tenant access tag management; drive health management, diagnostics, etc.; power management; and security management, among other commands. For example, security management may include setting up authentication for Secure Multiple Tenant, setting up data-at-rest encryption (e.g. encrypting data received at the storage device before storing the data), instant secure erase, access to other management methods, reporting on drive capacity, etc.

In some embodiments, an apparatus may comprise a data storage device configured to store data as objects, and receive a command including an operation directed to an object and an indicator that specifies a variation of the operation to be performed. Each object may include a tracking indicator to identify the object, a data field with a variable size to store user data, and at least one metadata field.

The apparatus may further comprise the indicator includes a time limit qualifier specifying an amount of time from receipt of the command within which the data storage device is directed to service the command, and the data storage device configured to return a status indicator for the command within the amount of time.

The apparatus may further comprise the indicator includes an early exit flag directing the data storage device to employ less than all recovery methods in implementing the operation, and the data storage device configured to return an operation status when the operation does not complete without employing all recovery methods.

The apparatus may further comprise the indicator includes at least one metadata flag, each metadata flag corresponding to one of the at least one metadata field of the object, and the data storage device configured to return data of each of the at least one metadata field corresponding to the at least one metadata flag.

The apparatus may further comprise the at least one metadata field includes a next object field including a tracking indicator value for a next object immediately following the object according to a tracking indicator organization scheme, the command includes a get next operation, and the data storage device configured to return a value of the next object field in response to the get next operation.

The apparatus may further comprise the at least one metadata field includes a previous object field including a tracking indicator value for a previous object immediately preceding the object according to a tracking indicator organization scheme, the command includes a get previous operation, and the data storage device configured to return a value of the previous object field in response to the get previous operation.

The data storage device may be further configured to associate a separate encryption key with each tenant of a plurality of tenants having access to the data storage device, and regulate a level of access to the data storage device permitted to a tenant based on the tenant's separate encryption key.

The apparatus may further comprise the command includes a send operation directing the data storage device to transfer an object from the data storage device to a separate destination data storage device identified in the command, and the data storage device configured to transfer the object based on the command.

The apparatus may further comprise the command includes an iterate operation directing the data storage device to perform another specified operation on a set of objects having a range of tracking indicator values specified by the command, and the data storage device configured to perform the specified operation on the set of objects.

The data storage device may be further configured to maintain a table of device operation (DO) values corresponding to device operations of the data storage device, receive the command including a specified DO value, and execute the device operation corresponding to the specified DO value from the table. In some embodiments the table includes a plurality of DO pages, each DO page corresponding to a category of operations and including a list of one or more DO values and corresponding device operations. In some embodiments, the command is in a format of a command directed at an object, including an object tracking indicator field of the command identifying a specified DO page and an object data field of the command identifying the specified DO value, and the data storage device may be configured to identify the device operation to perform based on values of the object tracking indicator field and the object data field.

The apparatus may further comprise a cache memory, and a non-volatile memory. The command may identify one or more objects to commit from the cache memory to the non-volatile memory, and the data storage device may be configured to commit the one or more identified objects from the cache memory to the non-volatile memory in response to the command.

In an embodiment, a memory device may store instructions that cause a processor to perform a method comprising storing data as objects to a nonvolatile media, and receiving a command including an operation directed to an object and an indicator that specifies a variation of the operation to be performed. Each object may include a tracking indicator to identify the object, and a data field with a variable size to store user data.

The method may further comprise the indicator includes a time limit qualifier specifying an amount of time from receipt of the command within which the data storage device is directed to service the command, and returning a status indicator for the command within the amount of time.

The method may further comprise each object further including at least one metadata field, the indicator includes at least one metadata flag, each metadata flag corresponding to one of the at least one metadata field of the object, and returning data of each of the at least one metadata field corresponding to the at least one metadata flag.

Each object may further have at least one metadata field including a next object field including a tracking indicator value for a next object immediately following the object according to a tracking indicator organization scheme, and a previous object field including a tracking indicator value for a previous object immediately preceding the object according to a tracking indicator organization scheme. The method may further comprise receiving the command including a get next operation, returning the tracking indicator value of the next object field in response to the get next operation, receiving the command including a get previous operation, and returning the tracking indicator value of the previous object field in response to the get previous operation.

The method may further comprise associating a separate encryption key with each tenant of a plurality of tenants having access to the nonvolatile media, and regulating a category of objects accessible by a tenant based on the tenant's separate encryption key.

The method may further comprise the command includes a send operation and an IP address of a separate destination data storage device, and transferring the object over a network to the IP address of to the separate destination data storage device based on the command.

The method may further comprise the command includes an iterate operation directing the processor to perform another specified operation on a set of objects having a range of tracking indicator values specified by the command, and performing the specified operation on the set of objects.

The method may further comprise maintaining a table including a plurality of device operation (DO) values corresponding to device operations the processor is configured to perform, and a plurality of device operation (DO) pages, each DO page corresponding to a category of device operations and including a list of one or more DO values and corresponding device operations. The command may be in a format of a command directed at an object, including an object tracking indicator field of the command identifying a specified DO page, and an object data field of the command identifying the specified DO value. The method may further comprise executing the device operation corresponding to the specified DO value from the table.

The method may further comprise the command identifies one or more objects to commit from a cache memory to the nonvolatile media, and committing the one or more identified objects from the cache memory to the nonvolatile media based on the command.

In some embodiments, a method may comprise storing data as objects to a memory device, and receiving a command including an operation directed to an object and an indicator that specifies a variation of the operation to be performed. Each object may include a tracking indicator to identify the object, and a data field with a variable size to store user data. The method may further comprise the indicator includes an early exit flag directing the memory device to employ less than all recovery methods in implementing the operation, and returning an operation status when the operation does not complete without employing all recovery methods. The method may further comprise the indicator includes at least one metadata flag, each metadata flag corresponding to one of at least one metadata field of the object, and returning data of each of the at least one metadata field corresponding to the at least one metadata flag. The method may further comprise associating a separate encryption key with each tenant of a plurality of tenants having access to the memory device, and regulating a subset of objects accessible by each tenant based on the tenant's separate encryption key. The method may further comprise the command includes a send operation and identifies a separate destination data storage device, and transferring the object over a network to the separate destination data storage device based on the command. The method may further comprise the command includes an iterate operation to perform another specified operation on a set of objects having a range of tracking indicator values specified by the command, and performing the specified operation on the set of objects. The method may further comprise maintaining a table including a plurality of device operation (DO) values corresponding to device operations memory device, the command is a device operation command, and is in a format of a command directed at an object, including an object data field of the command identifying a specified DO value, and executing the device operation corresponding to the specified DO value from the table. The method may further comprise the command identifies one or more objects to commit from a cache memory to a nonvolatile media, and committing the one or more identified objects from the cache memory to the nonvolatile media based on the command.

In an embodiment, an apparatus may comprise a data storage device configured to store data as objects having a variable-size data container, and receive a command including an operation directed to an object and a quality of service identifier that specifies a level of service associated with the operation.

The operation may include a put command directing the data storage device to store data to a memory of the data storage device. The quality of service identifier may include a write-back identifier directing the data storage device to store the data without returning an indication that the data has been stored to non-volatile memory. The quality of service identifier may include a power-safe write-back identifier directing the data storage device to store the data to non-volatile memory if power is lost. The quality of service identifier may include a write-through identifier directing the data storage device to return an indication once the data has been stored to non-volatile memory.

The operation may include a get command to retrieve data from the data storage device, and the quality of service identifier includes a normal identifier to direct the data storage device to limit procedures to recover the data if a first read operation fails.

The operation may include a delete command to remove an instance of data from the data storage device, and the quality of service identifier includes a cryptographic erase identifier to direct the data storage device to securely erase a cryptographic key used to decrypt the data.

In some embodiments, an apparatus may comprise a memory device having a processor configured to store data as objects, and receive a command including an operation directed to an object and a quality of service identifier that specifies a level of service associated with the operation. Each object may include an object identifier field to track the object, and a user data field for user data of the object.

The operation may include a put command directing the processor to store data to a storage medium of the memory device. The quality of service identifier may include a command modifier from a list including: a write-back identifier directing the processor to store the data without returning an indication that the data has been stored to non-volatile memory; a power-safe write-back identifier directing the processor to store the data to non-volatile memory if power is lost; a write-through identifier directing the processor to return an indication once the data has been stored to non-volatile memory; and a verified identifier directing the processor to return an indication once the data has been stored to non-volatile memory and successfully read from the non-volatile memory.

The operation may include a get command to retrieve data from the memory device. The quality of service identifier may include a scan identifier to direct the processor to perform a media scan on memory sectors containing the data. The quality of service identifier may include a repair identifier to direct the processor to perform all available methods to recover the data if a first data retrieval operation fails.

The operation may include a delete command to remove an instance of data from the memory device. The quality of service identifier may include a media erase identifier to direct the processor to change a physical state of a data storage medium to accomplish the delete. The quality of service identifier may an empty identifier to direct the processor to replace data in the user data field with a null value. The quality of service identifier may include an enhanced erase identifier to direct the data storage device to remove all instances of the data.

In an embodiment, an apparatus may comprise a data storage device configured to store data as objects, and receive a command including an operation directed to an object and a quality of service identifier that specifies a level of service associated with the operation. Each object may include a tracking indicator to identify the object, and a data field with a variable size to store user data. The operation may include a put command directing the data storage device to store data to a memory of the data storage device, and the quality of service identifier may include a verified identifier directing the data storage device to return an indication once the data has been stored to non-volatile memory and successfully read from the non-volatile memory. The operation may include a get command to retrieve data from the data storage device, and the quality of service identifier includes a data quality identifier to direct the data storage device to return a hash of the data field.

The operation may include a delete command to remove an instance of data from the data storage device, and the quality of service identifier may include a command modifier from a list including: a cryptographic erase identifier to direct the data storage device to securely erase a cryptographic key used to decrypt the data; a media erase identifier to direct the data storage device to change a physical state of a data storage medium to accomplish the delete; an empty identifier to direct the data storage device to replace data in the data field with a null value; and an enhanced erase identifier to direct the data storage device to remove all instances of the data.

In an embodiment, an apparatus may comprise a data storage device configured to store data as objects, each object including a data field with a variable size to store user data, and receive a command including an operation directed to an object and a data integrity identifier to perform the operation based on a hash value of the user data.

The operation may include a put command directing the data storage device to store data to a memory of the data storage device and a received hash value, and the data integrity identifier may include a command modifier from a list including: a verify identifier directing the data storage device to perform a specified hash algorithm on the data field and compare the result against the received hash value; a writeback verify identifier directing the data storage device to store the data to a volatile memory, read the data field from the volatile memory, perform a specified hash algorithm on the data field read from the volatile memory, and compare the result against the received hash value; and a write-through verify identifier directing the data storage device to store the data to a non-volatile memory, read the data field from the non-volatile memory, perform a specified hash algorithm on the data field read from the non-volatile memory, and compare the result against the received hash value.

The operation may include a get command to retrieve data from the data storage device. The data integrity identifier may include a verify identifier directing the data storage device to perform a specified hash algorithm on the data field and compare the result against the hash value of the data stored as metadata. The data integrity identifier may include a hash fetch identifier directing the data storage device to return the hash value of the data.

The operation may include a delete command to remove an instance of data from the data storage device, and the indicator may include a verify data integrity identifier including a hash value of the data field of the object. The data storage device may be configured to delete the object if the data integrity identifier matches the result of a hash operation performed on the data field of the object.

An apparatus may comprise a data storage device configured to store data as objects, and receive a command including an operation directed to an object and a data integrity identifier to perform the operation based on a hash value of the user data. Each object may include a tracking indicator to identify the object, and a data field with a variable size to store user data.

The operation may include a put command directing the data storage device to store data to a memory of the data storage device. The data integrity identifier may include a verify identifier directing the data storage device to perform a specified hash algorithm on the data field and compare the result against a received hash value included with the put command. The data integrity identifier may include a writeback verify identifier directing the data storage device to store the data to a volatile memory, read the data field from the volatile memory, perform a specified hash algorithm on the data field read from the volatile memory, and compare the result against a received hash value included with the put command. The data integrity identifier may include a write-through verify identifier directing the data storage device to store the data to a non-volatile memory, read the data field from the non-volatile memory, perform a specified hash algorithm on the data field read from the non-volatile memory, and compare the result against a received hash value included with the put command.

The operation may include a get command to retrieve data from the data storage device. The data integrity identifier may include a hash fetch identifier directing the data storage device to return the hash value of the data. The hash fetch identifier may direct the data storage device to return the hash value of the data stored as metadata of the object. The hash fetch identifier may direct the data storage device to return the hash value of a cached copy of the data.

The operation may include a delete command to remove an instance of data from the data storage device, the indicator may include a verify data integrity identifier including a hash value of the data field of the object, and the data storage device may be configured to delete the object if the data integrity identifier matches the result of a hash operation performed on the data field of the object.

In an embodiment, an apparatus may comprise a processor configured to store data as objects, each object including a data field with a variable size to store user data, and receive a command including an operation directed to an object, and a data integrity identifier to perform the operation based on a hash value of the user data.

The operation may include a put command directing the processor to store data to a memory device, and the data integrity identifier may be modified by a quality of service identifier that specifies a level of service associated with the operation, directing the processor to store the data to an object of the memory device as directed by the quality of service identifier, then read the data field of the object back from the memory device, perform a specified hashing algorithm on the data field read from the memory device, and compare the result against a received hash value included with the put command.

The operation may include a get command to retrieve data from a memory device, and the data integrity identifier may include a hash media identifier directing the processor to perform a specified hash algorithm on the data retrieved from the memory device and return a result of the specified hash algorithm.

The operation may a delete command to replace the user data in the data field of the object with a null value, the indicator may include a verify data integrity identifier directing the processor to return the hash value of the data field of the object, and the processor may be configured to replace the data field of the object with a null value, perform a hash operation on the data field of the object to obtain the hash value, and return the hash value.

In an embodiment, an apparatus may comprise a data storage device configured to store data as objects, and receive a command including an operation directed to an object and an access control identifier used to determine whether to perform the operation. Each object may include a tracking indicator to identify the object, and a data field with a variable size to store user data.

The operation may include a put command directing the data storage device to store data to a memory of the data storage device, and the access control identifier may include a new key identifier directing the data storage device to execute the command when no preexisting object has a tracking indicator matching a specified tracking indicator from the command.

The access control identifier may include an unrestricted identifier directing the data storage device to execute the command without regard to whether a preexisting object has a tracking indicator matching a specified tracking indicator from the command.

The access control identifier may include an unspecified version identifier directing the data storage device to execute the command when a preexisting object has a tracking indicator matching a specified tracking indicator from the command.

The access control identifier may include a specified version identifier directing the data storage device to execute the command when a preexisting object has a tracking indicator matching a specified tracking indicator from the command, and the preexisting object has an access tag metadata field, used to regulate access to the preexisting object, matching a specified version identifier from the command.

The apparatus may further comprise the data storage device configured to store data as objects including a current access tag metadata field to regulate access to an object, and the access control identifier may include an old access tag value corresponding to the current access tag metadata field of the object, and a new access tag value to update the current access tag metadata field after modifying the object. The data storage device may be configured to compare the old access tag value against the current access tag metadata field to regulate access to the data by multiple clients to keep the data synchronized, execute the command when the old access tag value matches the current access tag metadata field, and change the current access tag metadata field to the new access tag value after executing the command.

The access control identifier may include a store access tag field identifying a state of a host device issuing the command, and the data storage device may be configured to compare the store access tag field against a store access tag value associated with the data storage device, and execute the command if the store access tag field matches the store access tag value.

The access control identifier may include a specified tenant access tag field identifying a state of a tenant issuing the command, and the data storage device may be configured to maintain a list of tenant access tag values for tenants in a network including the data storage device, the tenant access tags identifying a state of a corresponding tenant, compare the specified tenant access tag field against the tenant access tag field corresponding to the tenant issuing the command, and execute the command if the specified tenant access tag field matches the tenant access tag value.

In an embodiment, an apparatus may comprise a data storage device configured to store data as objects, and receive a command including an operation directed to an object and an access control identifier used to determine whether to perform the operation. Each object may include a tracking indicator to identify the object, a data field with a variable size to store user data, and at least one metadata field.

The at least one metadata field may include a current access tag metadata field to regulate access to an object, and the data storage device may be configured to regulate access to the data by multiple clients to keep the data synchronized by comparing the access control identifier against the current access tag metadata field prior to performing the operation. The operation may include a get command to retrieve data from the data storage device, and the access control identifier may direct the data storage device to return the current access tag metadata field. The operation may include a delete command to remove an instance of data from the data storage device, and the data storage device may be configured to execute the delete command when the current access tag metadata field matches a specified version identifier from the command.

The access control identifier may include an old access tag value corresponding to the current access tag metadata field of the object, and a new access tag value to update the current access tag metadata field after modifying the object. The operation may include a put command directing the data storage device to store data to a memory of the data storage device. The data storage device configured to determine whether the old access tag value is set to null, and determine whether an existing object is already stored having a tracking indicator matching a new tracking indicator received with the command. When the old access tag value is set to null, the data storage device may be configured to store the data associated with the put as a new object and store the new access tag value to the new object's access tag metadata field when no existing object is already stored with a matching tracking indicator, and not store the data associated with the put when an existing object is already stored with a matching tracking indicator. When the old access tag value is not set to null, the data storage device may be configured to not store the data associated with the put when no existing object is already stored with a matching tracking indicator, and determine whether the existing object's access tag metadata field matches the old access tag value when an existing object is already stored with a matching tracking indicator. When the existing object's access tag metadata field does not match the old access tag value, the data storage device may be configured to not store the data associated with the put. when the existing object's access tag metadata field does match the old access tag value, the data storage device may be configured to store the data associated with the put to the data field of the existing object and store the new access tag value to the existing object's access tag metadata field.

The access control identifier may include a store access tag field based on a version of software running on a host device issuing the command, and the data storage device may be configured to compare the store access tag field against a store access tag value associated with the data storage device, the store access tag value is based on a version of software running on the data storage device, and execute the command if the store access tag field matches the store access tag value.

The access control identifier may include a specified tenant access tag field identifying a state of a tenant issuing the command, and the data storage device may be configured to maintain a list of tenant access tag values for tenants in a network including the data storage device, the tenant access tags identifying a state of a corresponding tenant, compare the specified tenant access tag field against the tenant access tag field corresponding to the tenant issuing the command, and execute the command if the specified tenant access tag field matches the tenant access tag value.

In an embodiment, a memory device may store instructions that cause a processor to perform a method comprising storing data as objects to a data storage media, and receiving a command including an operation directed to an object and an access control identifier used to determine whether to perform the operation. Each object may include a tracking indicator to identify the object, and a data field with a variable size to store user data.

The access control identifier may include an old access tag value and a new access tag value, and the operation may include a put command directing data to be stored the data storage media. The method may further comprise storing data as objects including an access tag metadata field to regulate access to an object, determining whether the old access tag value is set to null, and determining whether an existing object is already stored having a tracking indicator matching a new tracking indicator received with the command. When the old access tag value is set to null, the method may include storing the data associated with the put as a new object and storing the new access tag value to the new object's access tag metadata field when no existing object is already stored with a matching tracking indicator, and not storing the data associated with the put when an existing object is already stored with a matching tracking indicator. When the old access tag value is not set to null, the method may comprise not storing the data associated with the put when no existing object is already stored with a matching tracking indicator, and determining whether the existing object's access tag metadata field matches the old access tag value when an existing object is already stored with a matching tracking indicator. When the existing object's access tag metadata field does not match the old access tag value, the method may comprise not storing the data associated with the put. When the existing object's access tag metadata field does match the old access tag value, the method may comprise storing the data associated with the put to the data field of the existing object and storing the new access tag value to the existing object's access tag metadata field.

The access control identifier may include a store access tag field identifying a state of a host device issuing the command, and the method may further comprise comparing the store access tag field against a store access tag value associated with the memory device, and executing the command if the store access tag field matches the store access tag value. The store access tag field may be based on a version of software running on the host device, and the store access tag value may be based on a version of software running on the processor.

In an embodiment, an apparatus may comprise a data storage device configured to store data as variable-size objects, each object including a tracking indicator to identify the object, and receive a command including an operation directed to an object and an indicator that specifies a variation of the operation to be performed.

The data storage device may be further configured to organize objects with one-dimensional ordering based on the tracking indicator of each object, and restrict each tenant of a plurality of tenants having access to the data storage device to accessing objects with tracking indicators from at least one specific range of tracking indicator values less than all of the tracking indicator values. The data storage device may be further configured to restrict each tenant to accessing objects with tracking indicators from at least one range of tracking indicator values restricted to specific tenants, and at least one range of unrestricted tracking indicator values. A tenant may include a plurality of related host devices. The data storage device may be further configured to associate each tenant with a specific tenant number, and the at least one specific range corresponds to tracking indicators with bits corresponding to the specific tenant number.

The command may include an operation to store a new object, the tracking indicator value of the new object may be selected by a host device, and specific bits of the tracking indicator may have organizational meaning to the host device.

The data storage device may be configured to store data as an object including an instance counter indicating a number of instances a command to store the object has been received at the data storage device.

In an embodiment, an apparatus may comprise a data storage device configured to store data as objects, and receive a command including an operation directed to an object and an indicator that specifies a variation of the operation to be performed. Each object may include a tracking indicator to identify the object, and at least one metadata field.

The command may include an operation to store a new object, the tracking indicator value of the new object may be selected by a host device, and specific bits of the tracking indicator may have organizational meaning to a host device. Specific bits of the tracking indicator may represent a file location of the new object within a file system structure of the host device. Specific bits of the tracking indicator may represent file associations between the new object and a second related object. Specific bits of the tracking indicator may represent an identifier of the host device. Specific bits of the tracking indicator may represent a time at which the new object was modified. The tracking indicator value may be based on the results of a hash algorithm performed on the data associated with the object.

The at least one metadata field may include an instance counter indicating a number of instances a command to store an object has been received at the data storage device, and the command may be a data storage command for the object. The data storage device may be configured to determine whether the instance counter of a preexisting object stored to the data storage device should be incremented based on the command, and increment the instance counter of the preexisting object based on the determination.

The data storage device may be further configured to restrict each tenant of a plurality of tenants having access to the data storage device to accessing objects with tracking indicators from at least one specific range of tracking indicator values less than all of the tracking indicator values.

In an embodiment, an apparatus may comprise a data storage device configured to store data as objects, and receive a command including an operation directed to an object and an indicator that specifies a variation of the operation to be performed. Each object may include a tracking indicator to identify the object, a data field with a variable size to store user data, and at least one metadata field.

The data storage device may be further configured to restrict each tenant of a plurality of tenants having access to the data storage device to accessing objects with tracking indicators from at least one specific range of tracking indicator values less than all of the tracking indicator values.

The command may include an operation to store a new object, the tracking indicator value of the new object may be selected by a host device, and specific bits of the tracking indicator may have organizational meaning to the host device.

The tracking indicator value may be selected by a host device based on the results of a hash algorithm performed on the data associated with the object. The at least one metadata field may include an instance counter indicating a number of instances a command to store an object has been received at the data storage device. The data storage device may be further configured to increment the instance counter of a preexisting object when the command includes a data storage command and a specified tracking indicator of the command matches the tracking indicator of the preexisting object, and decrement the instance counter of the preexisting object when the command includes a delete command and the specified tracking indicator matches the tracking indicator of the first object. The data storage device may be further configured to delete the object when the instance counter falls below a threshold value. The data storage device may be further configured to delete the object regardless of a value of the instance counter when the command includes an enhanced delete operation directed to the object. The data storage device may be further configured to increment the instance counter of the object when the command includes an enhanced put operation directed to the object, an enhanced put operation including a tracking identifier for the object but not including user data for the data field of the object.

It is to be understood that features of the various described embodiments and examples may be combined, other embodiments may be utilized, and structural changes may be made without departing from the scope of the present disclosure.

In accordance with various embodiments, the methods described herein may be implemented as one or more software programs running on a computer processor or controller. In accordance with some embodiments, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and instructions described herein. Further, the methods and instructions described herein may be implemented as a computer readable data storage medium or device including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a memory device having a processor configured to:
    store data as objects having a variable-size data container;
    receive commands including:
        an operation directed to an object;
        a quality of service identifier that specifies a level of service associated with the operation;
    the commands include:
        a delete operation to remove an instance of data from the memory device and a first quality of service identifier including a command modifier from a group consisting of:
            a cryptographic erase identifier to direct the memory device to securely erase a cryptographic key used to decrypt the data;
            a media erase identifier to direct the memory device to change a physical state of a data storage medium to accomplish the delete;
            an empty identifier to direct the memory device to replace data in the data field with a null value; and
            an enhanced erase identifier to direct the memory device to remove all instances of the data.

2. The apparatus of claim 1 further comprising:
the commands include a put operation directing the memory device to store data to a memory of the memory device.

3. The apparatus of claim 2 further comprising:
the put operation includes a second quality of service identifier including a write-back identifier directing the memory device to store the data without returning an indication that the data has been stored to non-volatile memory.

4. The apparatus of claim 2 further comprising:
the put operation includes a second quality of service identifier including a power-safe write-back identifier directing the memory device to store the data to non-volatile memory if power is lost.

5. The apparatus of claim 2 further comprising:
the put operation includes a second quality of service identifier including a write-through identifier directing the memory device to return an indication once the data has been stored to non-volatile memory.

6. The apparatus of claim 1 further comprising:
the commands include a get operation to retrieve data from the memory device.

7. The apparatus of claim 6 further comprising:
the get operation includes a second quality of service identifier including a command modifier from a group consisting of:
    a normal identifier to direct the memory device to limit procedures to recover the data if a first read operation fails;
    a data quality identifier to direct the memory device to return a hash of the data field;
    a scan identifier to direct the processor to perform a media scan on memory sectors containing the data; and
    a repair identifier to direct the processor to perform all available methods to recover the data if a first data retrieval operation fails.

8. An apparatus comprising:
a memory device having a processor configured to:
    store data as objects, each object including:
        an object identifier field to track the object;
        a user data field for user data of the object;
    receive commands including:
        an operation directed to an object;
        a quality of service identifier that specifies a level of service associated with the operation;

the commands include:
a put operation directing the processor to store data to a storage medium of the memory device and a first quality of service identifier includes a command modifier from a group consisting of:
a write-back identifier directing the processor to store the data without returning an indication that the data has been stored to non-volatile memory;
a power-safe write-back identifier directing the processor to store the data to non-volatile memory if power is lost;
a write-through identifier directing the processor to return an indication once the data has been stored to non-volatile memory; and
a verified identifier directing the processor to return an indication once the data has been stored to non-volatile memory and successfully read from the non-volatile memory.

9. The apparatus of claim 8 further comprising:
the commands include a get operation to retrieve data from the memory device.

10. The apparatus of claim 9 further comprising:
the get operation includes a second quality of service identifier including a scan identifier to direct the processor to perform a media scan to check memory sectors containing the data for errors or unreliability.

11. The apparatus of claim 9 further comprising:
the get operation includes a second quality of service identifier including a repair identifier to direct the processor to perform all available methods to recover the data if a first data retrieval operation fails.

12. The apparatus of claim 9 further comprising:
the get operation includes a second quality of service identifier including a normal identifier to direct the memory device to limit procedures to recover the data if a first read operation fails.

13. The apparatus of claim 8 further comprising:
the commands include a delete operation to remove an instance of data from the memory device.

14. The apparatus of claim 13 further comprising:
the delete operation includes a second quality of service identifier including a media erase identifier to direct the processor to change a physical state of a data storage medium to accomplish the delete.

15. The apparatus of claim 13 further comprising:
the delete operation includes a second quality of service identifier including an empty identifier to direct the processor to replace data in the user data field with a null value.

16. The apparatus of claim 13 further comprising:
the delete operation includes a second quality of service identifier including an enhanced erase identifier to direct the memory device to remove all instances of the data.

17. An apparatus comprising:
a memory device including a processor configured to:
store data as objects, each object including:
a tracking indicator to identify the object;
a data field with a variable size to store user data;
receive commands including:
an operation directed to an object;
a quality of service identifier that specifies a level of service associated with the operation;
the commands include:
a delete operation to remove an instance of data from the memory device and a first quality of service identifier including a command modifier from a group consisting of:
a cryptographic erase identifier to direct the memory device to securely erase a cryptographic key used to decrypt the data;
a media erase identifier to direct the memory device to change a physical state of a data storage medium to accomplish the delete;
an empty identifier to direct the memory device to replace data in the data field with a null value; and
an enhanced erase identifier to direct the memory device to remove all instances of the data.

18. The apparatus of claim 17 further comprising:
the commands include a put operation directing the memory device to store data to a memory of the memory device; and
the put operation includes a second quality of service identifier including a verified identifier directing the memory device to return an indication once the data has been stored to non-volatile memory and successfully read from the non-volatile memory.

19. The apparatus of claim 18 further comprising:
the put operation includes a third quality of service identifier including a write-back identifier directing the processor to store the data without returning an indication that the data has been stored to non-volatile memory.

20. The apparatus of claim 17 further comprising:
the commands include a get operation to retrieve data from the memory device, and
the get operation includes a second quality of service identifier including a data quality identifier to direct the memory device to return a hash of the data field.

* * * * *